(12) United States Patent
Lethin et al.

(10) Patent No.: US 8,572,595 B1
(45) Date of Patent: Oct. 29, 2013

(54) METHODS AND APPARATUS FOR AGGRESSIVE SCHEDULING IN SOURCE CODE COMPILATION

(75) Inventors: Richard A. Lethin, New York, NY (US); Allen K. Leung, New York, NY (US); Benoit J. Meister, New York, NY (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 108 days.

(21) Appl. No.: 13/204,517

(22) Filed: Aug. 5, 2011

Related U.S. Application Data

(63) Continuation-in-part of application No. 12/561,152, filed on Sep. 16, 2009, and a continuation-in-part of application No. 12/365,780, filed on Feb. 4, 2009.

(60) Provisional application No. 61/097,799, filed on Sep. 17, 2008, provisional application No. 61/065,294, filed on Feb. 8, 2008, provisional application No. 61/371,126, filed on Aug. 5, 2010.

(51) Int. Cl.
*G06F 9/45* (2006.01)

(52) U.S. Cl.
USPC ........... 717/155; 717/127; 717/131; 717/141; 717/147

(58) Field of Classification Search
USPC .................. 717/127, 131, 141, 155
See application file for complete search history.

(56) References Cited

U.S. PATENT DOCUMENTS

| | | | |
|---|---|---|---|
| 5,442,797 A | 8/1995 | Casavant et al. | |
| 5,613,136 A | 3/1997 | Casavant et al. | |
| 5,742,814 A | 4/1998 | Balasa et al. | |
| 6,006,033 A | 12/1999 | Heisch | |
| 6,279,113 B1 | 8/2001 | Vaidya | |
| 6,327,699 B1 | 12/2001 | Larus et al. | |
| 6,651,246 B1 | 11/2003 | Archambault et al. | |
| 7,086,038 B2 | 8/2006 | Cronquist et al. | |
| 7,185,327 B2 * | 2/2007 | Scales | 717/155 |
| 7,594,260 B2 | 9/2009 | Porras et al. | |
| 7,634,566 B2 | 12/2009 | Turner et al. | |
| 7,757,222 B2 | 7/2010 | Liao et al. | |
| 8,087,010 B2 | 12/2011 | Eichenberger et al. | |
| 8,108,845 B2 | 1/2012 | Little et al. | |
| 8,230,408 B2 * | 7/2012 | Eng | 717/149 |
| 8,250,550 B2 | 8/2012 | Luszczek et al. | |
| 8,255,890 B2 | 8/2012 | Luszczek et al. | |
| 8,307,347 B2 * | 11/2012 | Austin et al. | 717/131 |

(Continued)

OTHER PUBLICATIONS

International Preliminary Report on Patentability dated Jan. 6, 2009 for PCT Application No. PCT/US2007/72260.

(Continued)

*Primary Examiner* — Chuck Kendall
(74) *Attorney, Agent, or Firm* — Goodwin Procter LLP

(57) ABSTRACT

Computer-executed transformation of source code enables optimization of the code for one or more of parallelism, locality, and memory footprint of operations represented in the source code on a computing apparatus. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

69 Claims, 13 Drawing Sheets

(56) References Cited

U.S. PATENT DOCUMENTS

| | | |
|---|---|---|
| 2003/0097652 A1 | 5/2003 | Roediger et al. |
| 2004/0034754 A1 | 2/2004 | Schreiber |
| 2006/0048121 A1 | 3/2006 | Blainey et al. |
| 2006/0048123 A1 | 3/2006 | Martin |
| 2007/0033367 A1 | 2/2007 | Sakarda et al. |
| 2009/0037889 A1 | 2/2009 | Li et al. |
| 2009/0083724 A1 | 3/2009 | Eichenberger et al. |
| 2009/0119677 A1 | 5/2009 | Stefansson et al. |
| 2009/0259997 A1 | 10/2009 | Grover et al. |
| 2009/0307673 A1 | 12/2009 | Eichenberger et al. |
| 2010/0050164 A1 | 2/2010 | Van De Waerdt et al. |
| 2010/0162226 A1 | 6/2010 | Borissov et al. |

OTHER PUBLICATIONS

International Preliminary Report on Patentability dated Nov. 1, 2011 for PCT Application No. PCT/U52010/033049.

Jonsson et al., "Verifying Safety Properties of a Class of Infinite-State Distributed Algorithms", Lecture Notes in Computer Science, 1995, vol. 939, pp. 42-53.

Mahajan et al., "Zchaff2004: An Efficient SAT Solver", LNCS, 2005, pp. 360-375.

International Preliminary Report on Patentability dated Oct. 27, 2011 for PCT Application No. PCT/US2010/031524.

Aloul et al, Solution and Optimization of Systems of Pseudo-Boolean Consraints, IEEE Transactions on Computers, vol. 56, No. 1 0, Oct. 2007, pp. 1415-1424.

Buluc et al, Parallel Sparse Matrix-Matrix Multiplication and Indexing: Implementation and Experiments, SIAM Journal of Scientific Computing (SISC), 2012.

Chang et al, Parallel sparse supports for array intrinsic functions of Fortran 90, J. Supercomput. 18(3):305-339, (2001).

Davis, Direct Methods for Sparse Linear Systems. SIAM, 2006 (100 pgs.).

Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.

Gundersen et al, Sparsity in higher order methods for unconstrained optimization, Optimization Methods and Software, 27(2):275-294 (2012).

Gustavson, Two Fast Algorithms for Sparse Matrices: Multiplication and Permuted Transposition, ACM Transactions on Mathematical Software, 4(3): 250-269, 1978.

Kolda et al, Scalable Tensor Decompositions for Multiaspect Data Mining, in ICDM 2008: Proceedings of the 8th IEEE International Conference on Data Mining, Dec. 2008, pp. 363-372.

Lathauwer et al, On the Best Rank-1 and Rank-$(R_1,R_2, \ldots ,R_N)$ Approximation of Higher-Order Tensors, SIAM J. Matrix Anal. Appl., 21:1324-1342, Mar. 2000.

Lin et al, Efficient data compression methods for multidimensional sparse array operations based on the EKMR scheme, IEEE Trans. Comput., 52(12):1640-1646, 2003.

Lin et al, Efficient Representation Scheme for Multidimensional Array Operations, IEEE Transactions on Computers, 51:327-345, 2002.

Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.

Vera et al, An Accurate Cost Model for Guiding Data Locality Transformations—Politecnica de Catalunya—Barcelona University—Sep. 2005.

* cited by examiner

METHODS AND APPARATUS FOR AGGRESSIVE SCHEDULING IN SOURCE CODE COMPILATION

CROSS REFERENCE TO RELATED APPLICATIONS

This application is a continuation-in-part of U.S. patent application Ser. No. 12/561,152, filed Sep. 16, 2009, which claims priority to and the benefit of U.S. provisional application Ser. No. 61/097,799, filed Sep. 17, 2008. This application is also a continuation-in-part of U.S. patent application Ser. No. 12/365,780, filed Feb. 4, 2009, which claims priority to and the benefit of U.S. provisional application Ser. No. 61/065,294, filed Feb. 8, 2008. In addition, this application claims priority to and the benefit of U.S. provisional application Ser. No. 61/371,126, filed Aug. 5, 2010. Disclosures of all of these applications are incorporated herein by reference in their entireties.

GOVERNMENT INTERESTS

This invention was made with Government support under contract no. W9113M-08-C-0146 awarded by the Missile Defense Agency and contract no. FA8650-09-C-1645 awarded by the Office of the Secretary of Defense. The Government has certain rights in the invention.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads per processing core. One limitation that these architectures experience is that many of the current commercially available compilers do not take advantage of the increased computational resources, e.g., multiple processors, multiple cores, etc.

In the software design and implementation process, compilers are typically responsible for translating the abstract operational semantics of the source program into a form that makes efficient use of a highly complex heterogeneous machine. Multiple architectural phenomena usually occur and interact simultaneously, requiring the optimizer to combine various program transformations. For instance, there is often a tradeoff between exploiting parallelism and exploiting locality of memory references to reduce the ever widening disparity between memory bandwidth and the processing capacity of the system—the disparity commonly known as the memory wall. Balancing the tension between parallelism and locality of memory references is important in compiler optimization.

More parallelism may allow more concurrent execution of the parallel portions of a program. Additional parallelism usually implicitly relates to the execution of more computational operations per second, often increasing the performance of a program. On the other hand, increasing locality generally directly translates into communication reduction between memories and processing elements, causing a reduction in the memory bandwidth required to execute the program. Because of program semantics constraints increasing parallelism typically decreases locality and increases the required bandwidth and increasing locality of memory references generally results in decreased parallelism.

In determining a good parallel schedule of a program, compilers are often limited by memory-based dependencies. These dependencies do not always directly contribute to the flow of values read and written while performing the computations required by the program. Sometimes, these dependencies arise when multiple temporary results must be stored in memory at the same time, thereby limiting the amount of parallelism in the program. Techniques to lessen the impact of such dependencies have been studied but they are subject to phase ordering issues. For instance, array privatization requires the loop to be in near-parallel form (i.e. it must not have any loop-carried dependencies) due to the prior scheduling decisions. On the other hand, techniques for performing array expansion and conversion to single assignment form suffer from increased memory usage and require additional techniques to reduce the memory footprint such as array contraction.

In general, the algorithms that optimize for parallelism allow for degrees of parallelism but cannot be used to control the amount of memory usage. In like manner, algorithms used for array privatization, array expansion, and array contraction generally depend on a given schedule and cannot be used for extracting or improving parallelism. Therefore there exists a need for improved systems and methods for source-code compilation.

SUMMARY OF THE INVENTION

In various embodiments, the present invention facilitates maximization of parallelization of a program, such that its performance is significantly enhanced, while satisfying a memory-usage constraint. This is achieved, in part, by employing a polyhedral model to unify parallelism extraction and communication optimizations with automatic management of memory. The scheduling and memory management functions are configured so as to perform all these optimizations, i.e., balancing parallelism and locality of memory references, and controlling memory usage in a unified (i.e., non-phase ordered) and unbiased manner.

Various embodiments of the present invention provide a method, apparatus, and computer software product for optimization of a computer program on a first computing apparatus for execution on a second computing apparatus. In an exemplary provided method computer program source code is received into a memory on a first computing apparatus. In this embodiment, the first computing apparatus' processor contains at least one multi-stage execution unit. The source code contains at least one arbitrary loop nest. The provided method produces program code that is optimized for execution on a second computing apparatus. In this method the second computing apparatus contains at least two multi-stage execution units. With these units there is an opportunity for parallel operations but it is dependent upon the insertion of additional memory locations to hold temporary data needed for intermediate computations. In its optimization of the code, the first computing apparatus takes into account the opportunity for parallel operations and locality and analyses the tradeoff of execution cost of a parallel execution against the amount of additional temporary storage needed to ensure a proper execution on the second computing apparatus. In this embodiment, the first computing apparatus minimizes the total costs and produces code that is optimized for execution on the second computing apparatus.

In another embodiment, a custom computing apparatus is provided. In this embodiment, the custom computing apparatus contains a storage medium, such as a hard disk or solid state drive, a memory, such as a Random Access Memory (RAM), and at least one processor. In this embodiment, the at least one processor contains at least one multi-stage execution unit. In this embodiment, the storage medium is customized to contain a set of processor executable instructions that, when executed by the at least one processor, configure the custom computing apparatus to optimize source code for execution on a second computing apparatus. The second computing apparatus, in this embodiment, is configured with at least two multi-stage execution units. This configuration allows the execution of some tasks in parallel, across the at least two execution units and others in serial on a single execution unit. In the optimization process the at least one processor takes into account the tradeoff between the cost of parallel operations against the amount of additional temporary storage needed to ensure a proper execution on a single multi-stage execution unit in the second computing apparatus.

In a still further embodiment of the present invention a computer software product is provided. The computer software product contains a computer readable medium, such as a CDROM or DVD medium. The computer readable medium contains a set of processor executable instructions, that when executed by a multi-stage processor within a first computing apparatus configure the first computing apparatus to optimize computer program source code for execution on a second computing apparatus. Like in the above described embodiments, the second computing apparatus contains at least two execution units. With at least two execution units there may be an opportunity for parallel operations. The configuration of the first computing apparatus includes a configuration to receive computer source code in a memory on the first computing apparatus and to optimize the costs of parallel execution, memory consumption and serial execution of tasks within the program, when executed on the second computing apparatus. The configuration minimizes these execution costs and produces program code that is optimized for execution on the second computing apparatus.

Accordingly, in one aspect a method, in another aspect an apparatus, and in yet another aspect a computer software product are provided for scheduling operations of a program on a multi-execution unit computing apparatus. The method, apparatus, or the computer software product includes receiving, at a first computing apparatus, a computer program comprising a set of operations, and optimizing the computer program for execution on a second computing apparatus. The second computing apparatus includes at least two execution units. The optimizing step includes (i) initializing a set of memory-based dependencies, (ii) performing dataflow analysis to identify one or more dataflow dependencies within the set of operations of the program, and (iii) scheduling the set of operations. The scheduling is based at least in part on a performance cost of a schedule and a memory-usage cost of the schedule. The performance cost may relate to the speed at which the program may be executed, which, at least in part relates to the parallelization of the program. As scheduled, any dependency in the set of memory-based dependencies and the identified one or more dataflow dependencies are not violated. A subset of operations in the set of operations is scheduled for execution by a first execution unit of the second computing apparatus and a subset of operations in the set of operations is scheduled for execution by a second execution unit of the second computing apparatus.

In some embodiments, the scheduling step includes either minimizing the performance cost (e.g., execution speed by improving parallelism), or limiting the memory-usage cost to a specified value, or both. The scheduling step may include employing a scheduling function, and the scheduling function may assign a partial execution order between iterations of an operation in the set of operations.

The method, apparatus, or product may include representing dependencies within the set of operations as a generalized dependence graph (GDG). One or more copy-out operations may also be added to the GDG, and all weak memory references in the set of operations may be transformed into strong memory references. In some embodiments, the initializing the set of memory-based dependencies includes adding one or more memory-based dependencies associated with a weak memory reference in the set of operations to the set of memory-based dependencies. The method, apparatus, or product may include determining a placement of operations in the set of operations according to a property of the second computing apparatus.

In some embodiments, the method, apparatus, or product includes collecting dependency violations after the scheduling step, and identifying a dependency violation that causes a semantic violation in the program. A loop type associated with an operation in the set of operations may be identified, such that the semantic violation is related to the loop type.

The method, apparatus, or product may include correcting a dependency violation after the scheduling step. A memory write operation in the set of operations may cause the dependency violation, and the correcting step may include renaming a memory location associated with the memory write operation as a new memory location. In some embodiments, the dependency violation is a liveness violation. The method, apparatus, or product may include replacing a memory read operation in the set of operations. The memory read operation reads from the renamed memory location, and is replaced with a new memory read operation reading from the new memory location.

In some embodiments, the correcting step includes expanding a write operation in the set of operations to provide a new memory location, thereby removing the semantic violation. The method, apparatus, or product mat also include performing index-set splitting transformation of a write operation in the set of operations, wherein the write operation causes the semantic violation.

In some embodiments, the optimizing step includes comparing the memory-usage cost with a specified memory limit, and if the memory limit is exceeded, (i) selecting a memory-based dependency, (ii) updating the set of memory-based dependencies with the selected memory-based dependency, and (iii) repeating the scheduling step. The selecting step may include identifying a memory-based dependency causing more semantic violations than any other memory-based dependency, or may include selecting all memory-based dependencies causing a semantic violation. The program after the scheduling step may retain a dependency violation that is not a semantic violation.

In some embodiments, the optimizing step includes determining a set of conditions that preserve the semantic correctness of the program, and representing the set of conditions preserving semantic correctness in the form of a generalized dependence graph. The method, apparatus, or computer software product also includes classifying the conditions into producer-consumer dependencies and memory-based dependencies, and deriving at least one multidimensional piecewise affine function to schedule operations in the optimized program. The method, apparatus, or computer software product may employ operation placement for the operations in the set of operations to filter semantic violations.

BRIEF DESCRIPTION OF THE DRAWINGS

Various embodiments of the present invention taught herein are illustrated by way of example, and not by way of limitation, in the figures of the accompanying drawings, in which.

Figure 1:
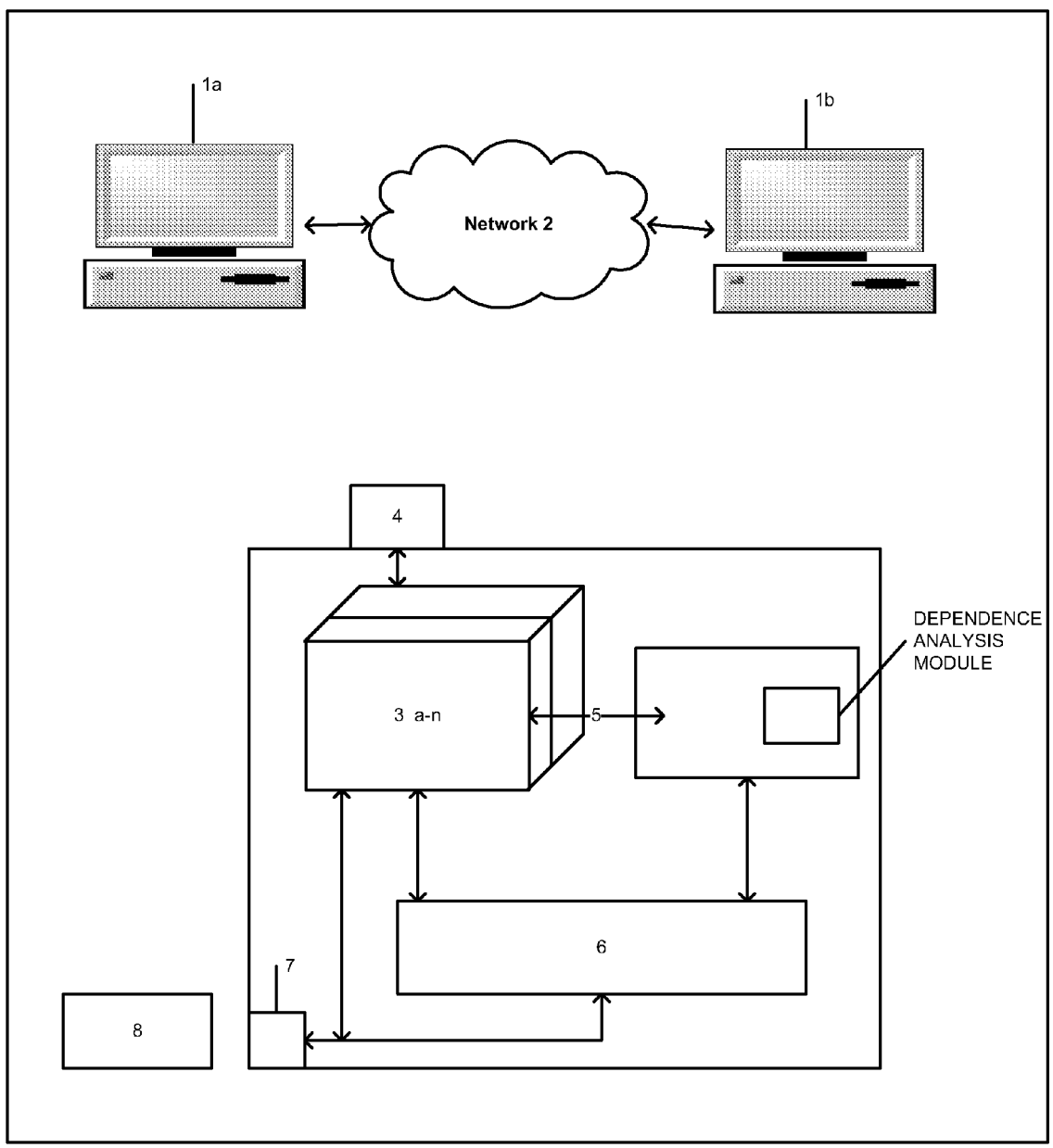
FIG. 1 illustrates a computer network and a computing apparatus consistent with provided embodiments.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Embodiments of the present invention provide a custom computing apparatus, illustrated in FIG. 1, that is configured to optimize computer source code for operation on a second computing apparatus. As illustrated, first custom computing apparatus 1(a) is configured to communicate with second computing apparatus 1(b) across network 2. A further illustration of computing apparatus 1 is provided in FIG. 1. In this illustration custom computing apparatus 1(a) contains at least one processor 3 (a-n), a communication port 4 communicating with the at least one processor 3 (a-n). Custom computing apparatus 1(a) additionally includes memory 5, which in some embodiments includes dependence analysis module. Custom computing apparatus 1(a), in some embodiments, additionally includes drive 7 configured to accept external storage medium 8. In some embodiments, external storage medium 8 is a CD, in others a DVD. In these embodiments, drive 7 is configured to accept the appropriate external storage medium 8. While CD and DVD are specifically enumerated in these embodiments, there are many external storage media that can be used to practice various aspects of the invention therefore some embodiments are not limited to the particular drive 7 configuration or external media 8. Custom computing apparatus 1(a) additionally includes storage medium 6. Storage medium 6 in some embodiments is a hard-disk drive, and in others is a solid state drive. In some embodiments, storage medium 6 contains a set of processor executable instructions that when executed by the at least one processor 3(a-n) configure custom computing apparatus 1(a) to optimize computer code for execution on computing apparatus 1(b). While custom computing apparatus 1(a) and computing apparatus 1(b) are illustrated in FIG. 1 communicating over network 2, various embodiments of the invention do not require this inter-computer communication.

Figure 2:
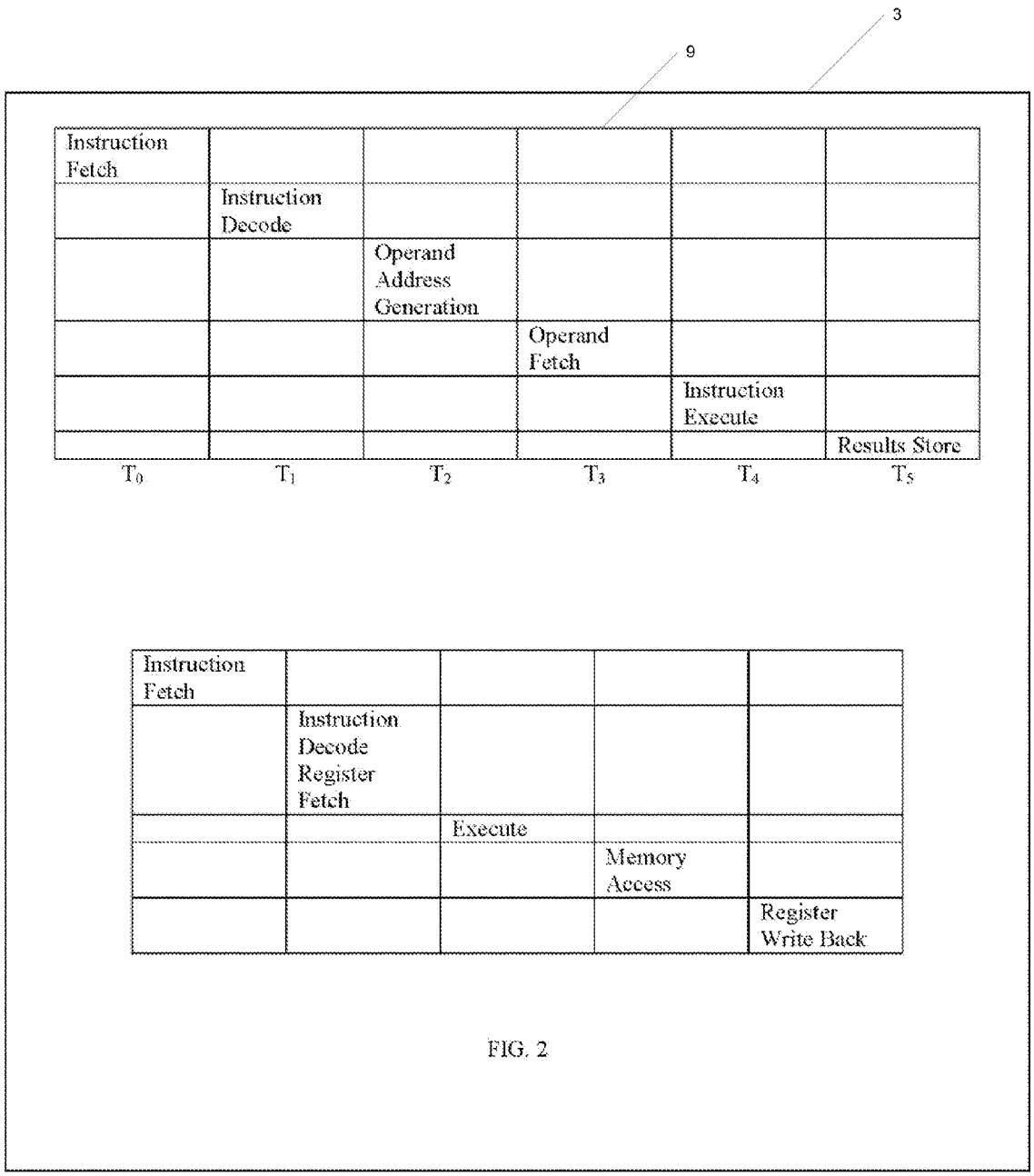
FIG. 2 illustrates processors with multi-stage execution units.

Various embodiments of the present invention are directed to processors containing multi-stage execution units, and in some embodiments multiple execution units. By way of example and not limitation to the particular multi-stage execution unit, FIG. 2 illustrates exemplary multi-stage execution units 9. In one embodiment, a 6-stage execution unit is utilized. In this embodiment, the stages may include instruction fetch, instruction decode, operand address generation, operand fetch, instruction execute, and result store. In another depicted multi-stage architecture, the stages include instruction fetch, instruction fetch & register decode, execute, memory access and register write-back. During routine operation of a multi-stage execution unit instructions are processed sequentially moving from stage to stage. In scheduling operations on multi-stage execution unit processors there are inherent difficulties that arise. For example, one instruction in one stage of the pipeline may attempt to read from a memory location while another instruction is writing to that location. This is problem is confounded in the instance of multiple processing cores. Additionally, in multiple processor and/or multiple core architectures, the locality of data to the execution unit attempting access can create significant delays in processing.

Figure 3:
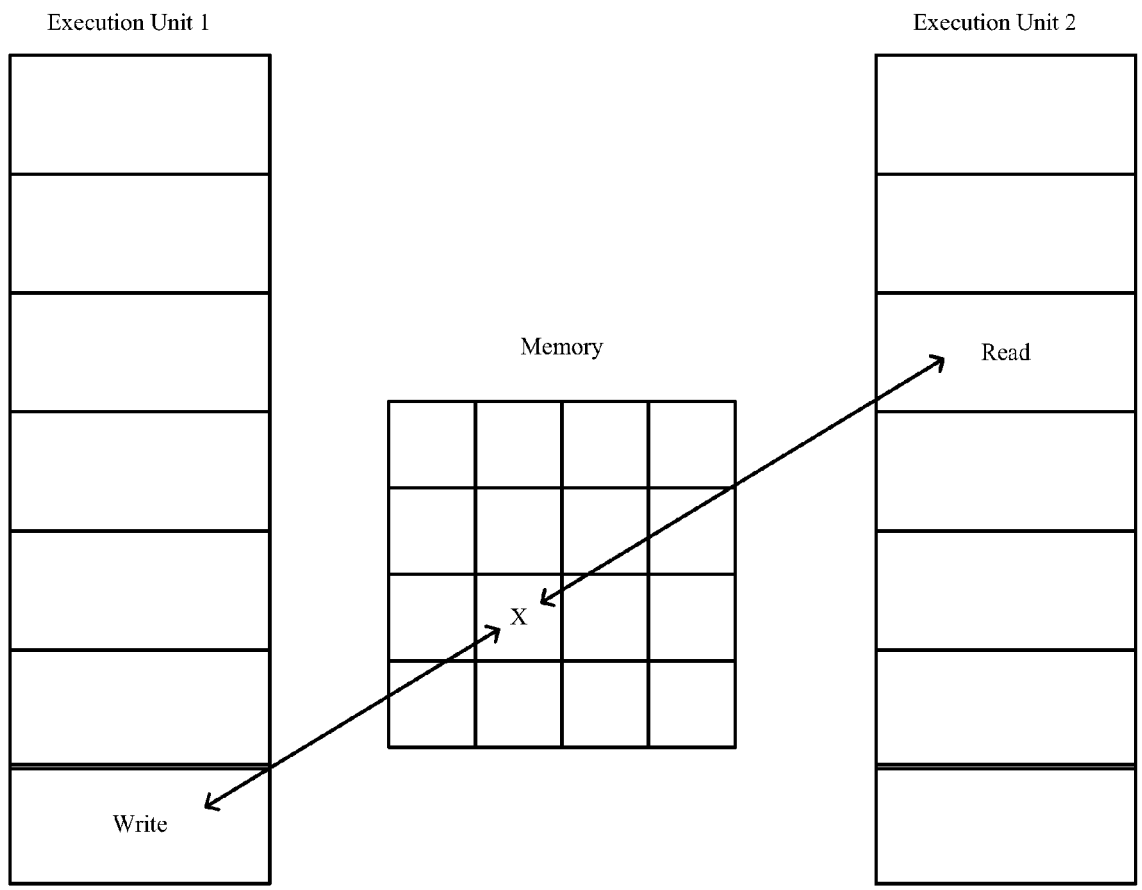
FIG. 3 illustrates a processor with multiple multi-stage execution units.

A further illustration of a multiple execution unit system is depicted in FIG. 3. In this illustration, a first execution unit (Execution Unit 1) is attempting to write to a specific memory location while a second execution unit (Execution unit 2) is attempting to read from that same location. This causes a condition known in the art as a processor stall which can significantly impact the speed of execution. While it may appear that parallel execution of instructions across multiple execution units and/or processors would produce an optimal result this is not always the case. Further, as previously discussed optimization, of source code for parallelism may result in code that is poor in terms of locality or communications. In the prior approaches to code optimization, the converse is additionally true. Optimization of code for locality can result in poor parallelism and under utilization of computing resources. It is therefore an object of embodiments of the present invention to provide a customized computing apparatus, methods, and computer software product that simultaneously optimizes a computer program for execution on a particular computing device with multiple execution units.

The following exemplary code illustrates loop fusion.

```
int i, a[100], b[100];
for (i=0; i<100; i++) {
a[i]=1;
}
for (i=0; i<100; i++) {
b[i]=2;
}
```

The effect of loop fusion is to interleave the execution of the first loop with the execution of the second loop, as illustrated by the corresponding transformed code:

```
int i, a[100], b[100];
for (i=0; i<100; i++) {
a[i]=1;
b[i]=2;
}
```

A consequence of loop fusion is that memory locations a[i] and b[i] referenced in the two original loops are now accessed in an interleaved fashion in the transformed loop. In the original code, memory locations were accessed in the order a[0], a[1], ... a[100], and then as b[0], b[1], ... b[100]. In the transformed code including the fused loops, the memory locations are accessed in the order a[0], b[0], a[1], b[1], ... a[100], b[100]. Loop fusion can lead to improved locality when multiple loops access the same memory locations. The improved locality can reduce the time a processing element must wait for the data resident in memory to be brought into a local memory such as a cache or a register.

Loop fusion can change the order in which memory locations of a program are accessed and requires special care to preserve the original program semantics as illustrated below:

```
int i, a[100], b[100];
for (i=0; i<100; i++) {
a[i]=1;
}
for (i=0; i<100; i++) {
b[i]=2+a[i+1];
}
```

In the program code above, the computation of b[i] depends on the previously computed value of a[i+1]. Therefore, simple loop fusion in this case is illegal; if we consider the value computed for b[0]=2+a[1], in the following fused program, b[0] will read a[1] at iteration i=0, before a[1] is computed at iteration i=1.

```
int i, a[100], b[100];
for (i=0; i<100; i++) {
a[i]=1;
b[i]=2+a[i+1];
}
```

In these situations, enabling transformations such as loop shifting, loop peeling, loop interchange, etc. can be used to make the loop fusion legal.

The problem of parallelism extraction is related to the problem of loop fusion in the aspect of preserving original program semantics. A loop in a program can be executed in parallel if there are no dependencies between its iterations. For example, the first loop in the program code below can be executed in parallel, while the second loop, without any transformation, must be executed in the sequential order:

```
int i, a[100], b[100];
for (i=0; i<100; i++) {
a[i]=1;
}
for (i=1; i<100; i++) {
b[i]=2+b[i-1];
}
```

In general the problems of loop fusion and parallelism extraction heavily influence each other, and in some cases, fusing two loops can cause the fused loop to be executed sequentially, possibly resulting in loss of parallelism.

Loop permutability is another important property of the source code often exploited during program optimizations. A nested loop structure is said to be permutable if the order of the loops in the nested structure can be interchanged without altering the semantics of the program. Loop permutability generally also means that the loops in the permutable nested-loop structure dismiss the same set of dependencies. Such dependencies are forward only when the loops are permutable. This means a multi-dimensional vector of the dependencies distances includes only non-negative components. For example, consider the following nested loop structure:

```
int i,j, a[100][100], b[100][100];
for (i=0; i<99; i++) {
for (j=0; j<99; j++) {
a[i+1][j+1]=a[i][j]+a[i][j+1]; // statement S
}
}
```

There are two flow dependencies between the statement S and itself. The two-dimensional dependence vectors are: (i−(i−1), j−(j−1))=(1,1) and (i−(i−1), j−j)=(1, 0). The components of these vectors are nonnegative for all possible values of i and j. Therefore the loops I and j are permutable and the loop interchange transformation preserves the semantics of the program. If loop interchange is applied, the resulting program becomes:

```
int i,j, a[100][100], b[100][100];
for (j=0; j<99; j++) {
for (i=0; i<99; i++) {
a[i+1][j+1]=a[i][j]+a[i][j+1]; // statement S
}
}
```

Loop permutability allows loop tiling (also called loop blocking). Loop tiling is a transformation that changes the order of the iterations in the program and ensures all the iterations of a "tile" are executed before any iteration of the next tile. When tiling by sizes (i=2, j=4) is applied to the transformed code above, the result is:

```
int i,j,ii,jj a[100][100], b[100][100];
for (j=0; j<99; j+=4) {
for (i=0; i<99; i+=2) {
for (jj=4*j; jj<4*j+4; jj++) {
for (ii=2*i; ii<2*i+2; ii++) {
a[ii+1][jj+1]=a[ii][jj]+a[ii][jj+1]; // statement S
}
}
}
}
```

Consider the memory locations written by the statement S. Before tiling, the locations are written in this order: a[1][1], a[1][2] . . . a[1][99], a[2][1], a[2][2] . . . a[2][99], a[3][1] . . . . After tiling, the new order of writes is the following: a[1][1], a[2][1], a[1][2], a[2][2] . . . a[1][4], a[2][4], a[4][1], a[5][1], a[4][2], a[5][2] . . . a[4][4], a[5][4] . . . etc. Loop tiling can result in improved locality when the same memory locations are written and read multiple times during the execution of a tile.

Loop tiling is traditionally performed with respect to tiling hyperplanes. In the example above, the tiling hyperplanes used are the trivial (i) and (j) hyperplanes. In the general case, any linearly independent combination of hyperplanes may be used for tiling, provided that the use of those hyperplanes does not violate program semantics. For example, (i+j) and (i+2*j) may be used as hyperplanes, and the resulting program may be more complex.

Another important loop transformation is loop skewing. Loop permutability combined with loop skewing can increase parallelism in the program code. In the following exemplary permutable loops, the inner loop can be executed in parallel after loop skewing:
```
int i,j a[100][100], b[100][100];
for (i=0; i<100; i++) {
for (j=0; j<100; j++) {
   a[i+1][j+1]=a[i][j]+a[i][j+1];
}
}
```
One possible code segment obtained by applying the loop skewing transformation is shown below in which the inner loop j, denoted as a "doall" loop, is marked for parallel execution:
```
int i,j a[100][100], b[100][100];
for (i=0; i<197; i++) {
doall (j=max(0, i–98); j<=min(98,i); j++) {
   a[i+1–j][j+1]=a[i–j][j]+a[i–j][j+1];
}
}
```
The skewing transformation helps extract parallelism at the inner level when the loops are permutable. Loop tiling and loop skewing can be combined to form parallel tiles that increase the amount of parallelism and decrease the frequency of synchronizations and communications in the program.

When considering high-level loop transformations, dependencies are commonly represented in the form of affine relations. In this, the first step is to assign to each statement in the program an iteration space and an iteration vector. Consider a program including the two loops shown below:
```
for (i=1; i<=n; i++) {
for (j=1; j<=n; j++) {
   a[i][j]=a[i][−1+j]+a[j][i]; // statement S
}
}
```
The iteration domain of the statement S is D={[i, j] in Z2|1≤i≤n, 1≤j≤n}. The second step is to identify when two operations may be executed in parallel or when a producer-consumer relationship prevents parallelism. This is done by identifying the set of dependencies in the program. In this example, the set of dependencies is: R={[[i, j], [i', j']]|i=j'−1, [i, j] in D, [i', j'] in D, <S, [i, j]><<<S, [i', j']>} union {[[i, j], [i', j']]|i=j', i=j', [i, j] in D, [i', j'] in D, <S, [i, j]><<<S, [i', j']>}, where << denoted multi-dimensional strict lexicographic ordering. This relationship can be rewritten as: a[i,j] a[j,i] {([i, j], [j, i])|1≤j, i≤n,−j+i−1≥0} union a[i,j] a[i,j−1] {([i, j+1], [i, j])|1≤j≤n−1, 0≤i≤n}.

The dependence relations may be represented using a directed dependence graph whose nodes represent the statements in the program and whose edges represent the dependence relations. In the example above, the dependence graph has one node and two edges. The dependence graph may be decomposed into strongly connected components. A strongly connected component of a graph is a maximal set of nodes that can be reached from any node of the set when following the directed edges in the graph. Usually, strongly connected components represent loops whose semantics require them to be fused in the optimized code. This may decrease parallelization of the program, but may also decrease the required memory bandwidth. Accordingly, in some embodiments, a tradeoff between parallelization of the program code and the selection of loops to fuse, which can decrease the required memory bandwidth, is explored. The depth of fusion of the loops, i.e., the level in the loop-nest structure of the loop being fused, may also be selected.

Traditional Techniques to Increase Parallelism

Array privatization allows a variable to be declared as local to a processor that sometimes helps create parallel loops and distribute them on multiple processors. In the following code, for example,
```
for (i=0; i<=n; i++) {
a=A[i];
B[i]=a;
}
```
the loop i can be made parallel if the variable a is declared private. Only certain loops can be parallelized using privatization. For instance, the following exemplary nested loop structure may not be parallelized using privatization because both i and j loops carry dependences:
```
for (i=0; i<=n; i++) {
for (j=0; j<=n; j++) {
   a=A[i][j+1]+A[i+1][j];
   A[i][j]=a;
}
}
```
The skewing transformation may also not be applied to the code segment above because the semantics of the memory-based dependencies reading and writing to memory location "a" make the transformation illegal. Nevertheless, in some embodiments a subset of semantic constraints are temporarily disregarded and later corrected so that certain transforms such as array privatization, skewing, etc., may be applied.

Examples of transforms that enable parallelization include array expansion and conversion to static single assignment, which can remove substantially all memory-based dependencies in a program. In the following example code as written, the outer loop may not be parallelized:
```
for (i=0; i<=n; i++) {
s=0;
for (j=0; j<=n; j++) {
   s=s+A[i][j]*B[j];
}
C[i]=s;
}
```
However, after full array expansion we can write:
```
doall (i=0; i<=n; i++) {
s[i][0]=0;
for (j=0; j<=n; j++) {
   s[i][j+1]=s[i][j]+A[i][j]*B[j];
}
C[i]=s[i][n+1];
}
```
The enabling transforms may also used for correction of a violated dependency, as explained in detail below. Full array expansion, as illustrated above can be prohibitively costly, and hence, it is generally not applicable. As fully explained below, in various embodiments array expansion is avoided until it is mandated by the schedule and the type of the transformed loop so as to achieve at least a partial parallelization of the program while reducing the memory consumption and/or memory bandwidth.

Violated Dependences

Typically, the dependence relations indicating the dependence between operations of a program are characterized by the type of the memory access. Common terminology distinguishes between whether a source statement S and a target statement T read or write a certain memory location. If S writes a memory location M that T subsequently reads later in the program, the relationship is called a Read-After-Write (or a producer-consumer) dependence. If S writes a memory location M that T subsequently writes later in the program, the relationship is called a Write-After-Write (or a memory-based output) dependence. If S reads a memory location M that T subsequently writes later in the program, the relationship is called a Write-After-Read (or a memory-based anti) dependence. If S reads a memory location M that T subsequently reads later in the program, the relationship is called a Read-After-Read (or a reuse) dependence.

In order to maximize parallelization of the program code, in various embodiments, a mechanism is provided to schedule the operations in the program such that the schedule always respects all the producer-consumer dependences and a specified subset of memory-based dependences. The remaining memory-based dependences in the program that are not part of the specified subset are analyzed to detect whether those dependences are violated under the obtained schedule. If those dependences are violated, a mechanism is provided to further transform the program code such that the scheduled transformed code does not result in semantic violations that may cause the program to operate in an unspecified, unintended manner.

Figure 4:
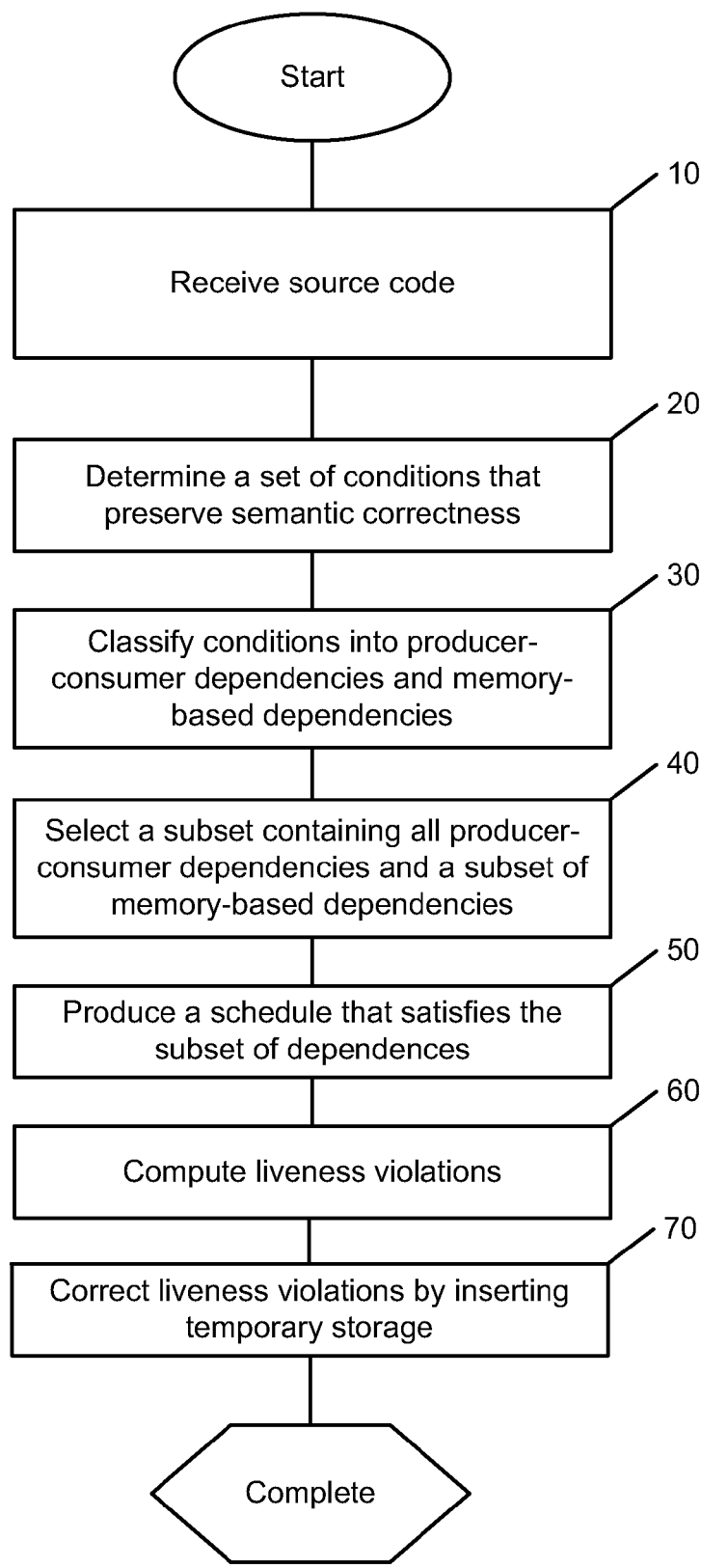
FIG. 4 illustrates an embodiment of a provided method of optimizing a computer program.

In an exemplary process illustrated with reference to FIG. 4, the source code to be optimized is received in step 10. A set of conditions (e.g., dependencies between pairs of statements of the code, each statement describing one or more operations) that would maintain the semantic correctness of the code are identified in step 20. As used herein, semantic correctness generally means executing the operations to obtain results which would be obtained by executing the operations as stated in the original, unmodified source code. In step 30, the various conditions are classified into producer-consumer (or read-after-write) dependencies and memory-based dependencies.

A subset of the producer-consumer dependencies and a subset of the memory-based dependencies are selected in step 40. The selection of the subsets can be based on dataflow analysis. In step 50, a schedule is produced that satisfies each dependency in the two subsets. Some conditions, i.e., dependencies, however, may be violated during scheduling. The liveness violations, i.e., the dependency violations that cause semantic violations are determined in step 60, and the liveness violations are corrected in step 70, for example, by providing additional storage. In effect, a schedule is obtained that does not cause any semantic violations, but may increase parallelism while limiting the memory footprint of the optimized code to a certain value, by permitting some dependencies to be violated.

A scheduling function $\Theta^S$ is a function that maps the iterations of S to time. It is a partial order that represents the relative execution order of each iteration of S relative to all other iterations of any statement in the program. If the scheduling function is injective, the output program is sequential; otherwise parallel iterations exist. In particular, the order extends to time after scheduling is applied. Scheduling functions allow the global reordering of statement iterations, in part, by applying one or more high-level loop transformations described above. In some embodiments according to the present invention the loop-type information is obtained by the scheduler, and the scheduling representation is extended with information pertaining to the kind of parallelism available in a loop. This additional information corresponds to the kinds of loop, namely: (1) doall loops that do not carry any dependency and can be executed in parallel; (2) permutable bands of loops that carry forward-only dependencies and may be safely interchanged and blocked (i.e., tiled); (3) sequential loops that must be executed in the specified order (but not necessarily by the same processor); and (4) reduction loops that can be executed in any sequential order (assuming the reduction operator is associative and commutative, otherwise they are degraded to sequential loops).

The kind of parallelism available in a loop can have direct implications on how the loop may be executed. Moreover, whether a certain dependency may be violated depends, in part, on the type of the loop. For example, as described in detail below, a certain order in which the statements in a loop may be executed may cause a dependency violation if those statements are in a sequential loop, but may not cause such a violation if those statements are in a doall loop. Therefore, in some embodiments the dependencies that must be observed by the scheduler and those that may be ignored are determined based on the loop-type information.

Dependence violations are related to scheduling functions. To determine whether a dependence relationship is violated in the case of a sequential loop, it is determined whether the order in which memory locations are accessed under the new schedule has been reversed. For example, consider the following code:

for (i=1; i<=n; i++) {
a[i]=a[i−1]; // statement S
}

In this form, the program writes the value a[0] into all the memory locations a[1] . . . a[n]. The only dependence relation is R={[[i], [i']]|i=i'−1, [i] in D, [i'] in D, <S, [i]><<S, [i']>1, where << denotes multi-dimensional strict lexicographic ordering. If we applied the loop reversal transformation which corresponds to the schedule $\Theta^S.i=-i$, the new program would be:

for (i=n; I>=1; i−s) {
a[i]=a[i−1]; // statement S
}

The dependence relation R would be violated because the memory locations are read and written in reverse order and a[n] would contain the value a[n−1] . . . a[1] would contain the value a[0].

A violated dependency is a relationship that mixes dependencies and scheduling. It can occur when dependent iterations of the source and the target statements are scheduled in different order. Given a dependency R={($i^S$, $i^T$)} between S and T and schedules $\Theta^S$ and $\Theta^T$ respectively, a sequential dependency violation occurs whenever $\Theta^T.i^T \ll \Theta^S.i^S$ and can be written V={($i^\uparrow$S,$i^\uparrow$T)∈R|$\Theta^\uparrow$T.$i^\uparrow$T« $\Theta^S.i^S$} where « denotes the strict lexicographic order. Under this order, as soon as a vector component is ordered, the whole vector is ordered. For instance (1, 2,−3)« (1, 3, 0) because 2<3 even if −3>0. However, the strict lexicographic order is not reflexive and (1, 2, −3)« (1, 2, −3) is not valid in V.

Figure 5:
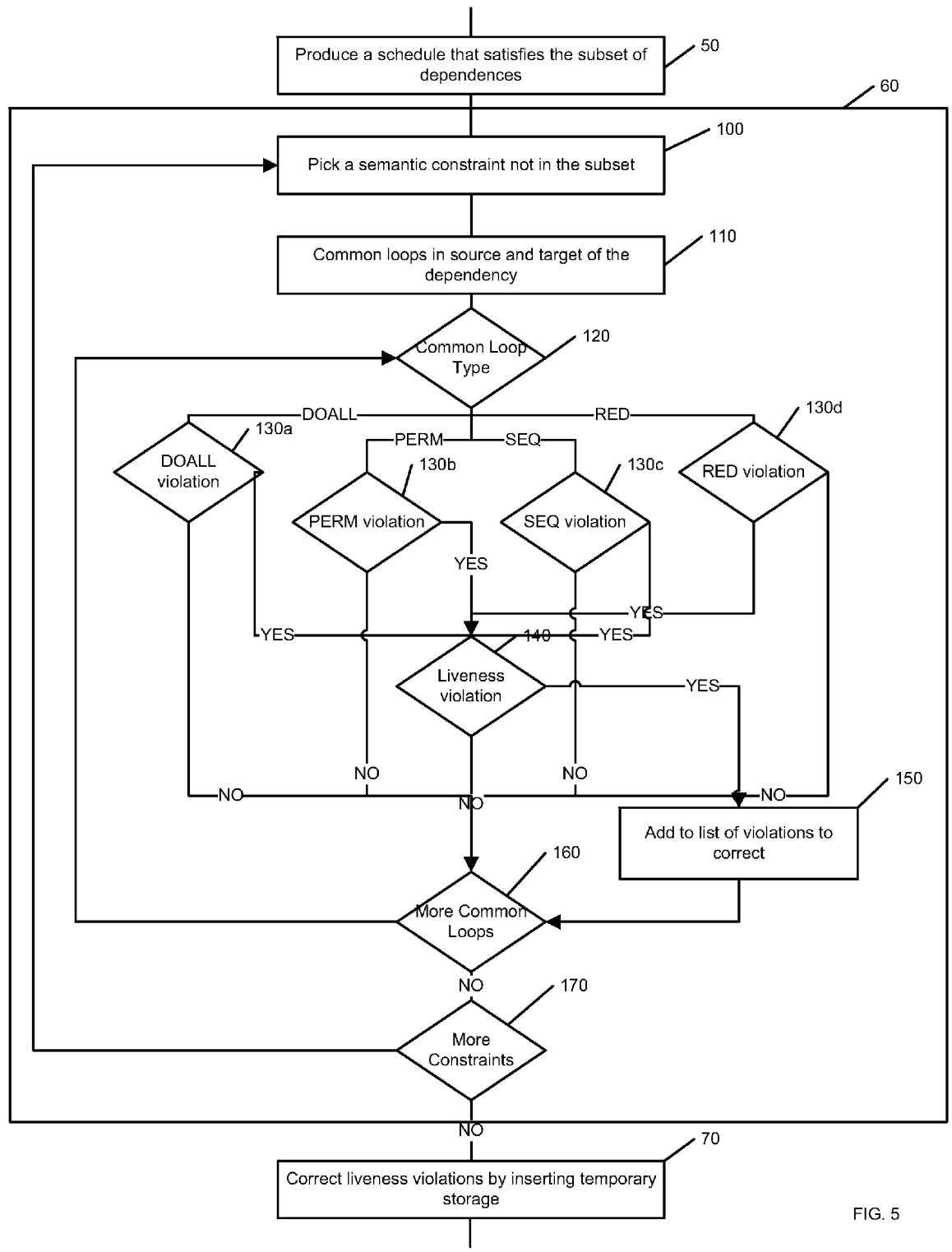
FIG. 5 illustrates an embodiment of a provided method of optimizing a computer program by analyzing loop types.

In the process illustrated with reference to FIG. 5, a semantic constraint not in the subset of dependencies satisfied by the scheduler is selected in step 100. In step 110, the loop (denoted as common loop) corresponding to the source and the target statements between which a memory-based dependency exists is identified. The type of the loop, e.g., doall loop, permutable loop, sequential loop, and reduction loop is also determined. Based on the loop type, in one of the steps 130a, 130b, 130c, 130d, it is determined whether the dependency between the source and the target statements is violated. If the memory-based dependency is not violated, the process is repeated from the step 120, identifying additional common loops.

If the memory-based dependency is violated, it is further determined in step 140 whether the violation is a liveness violation. Such a dependency must be corrected, and hence, it is added to a list of dependencies to be corrected in step 150. Then, as before, the process is repeated from the step 120 until no more common loops are found in step 160. The steps 120 through 160 are repeated by selecting the next semantic constraint in the step 100, until all semantic constraints are evaluated as described above. The memory-based dependencies added to the list of dependencies to be corrected in the step 150 are corrected, e.g., by providing temporary storage, in step 70.

In some embodiments, the dependency-violation-detection analysis is extended to loops other than sequential loops. In the case of doall loops, the order relationship used is « =which denotes the non-strict lexicographic order. This order follows the same rules as the strict lexicographic order with the addition that it is reflexive. A doall dependence violation occurs whenever $\Theta^T.i^T \ll = \Theta^S.i^S$ and can be written $V=\{(i^T S, i^T T) \in R | \Theta^T.i^T T \ll = \Theta^S.i^S\}$. In this case, (1, 2, −3)« = « ■(1, 2, −3) is valid in V.

Figure 6:
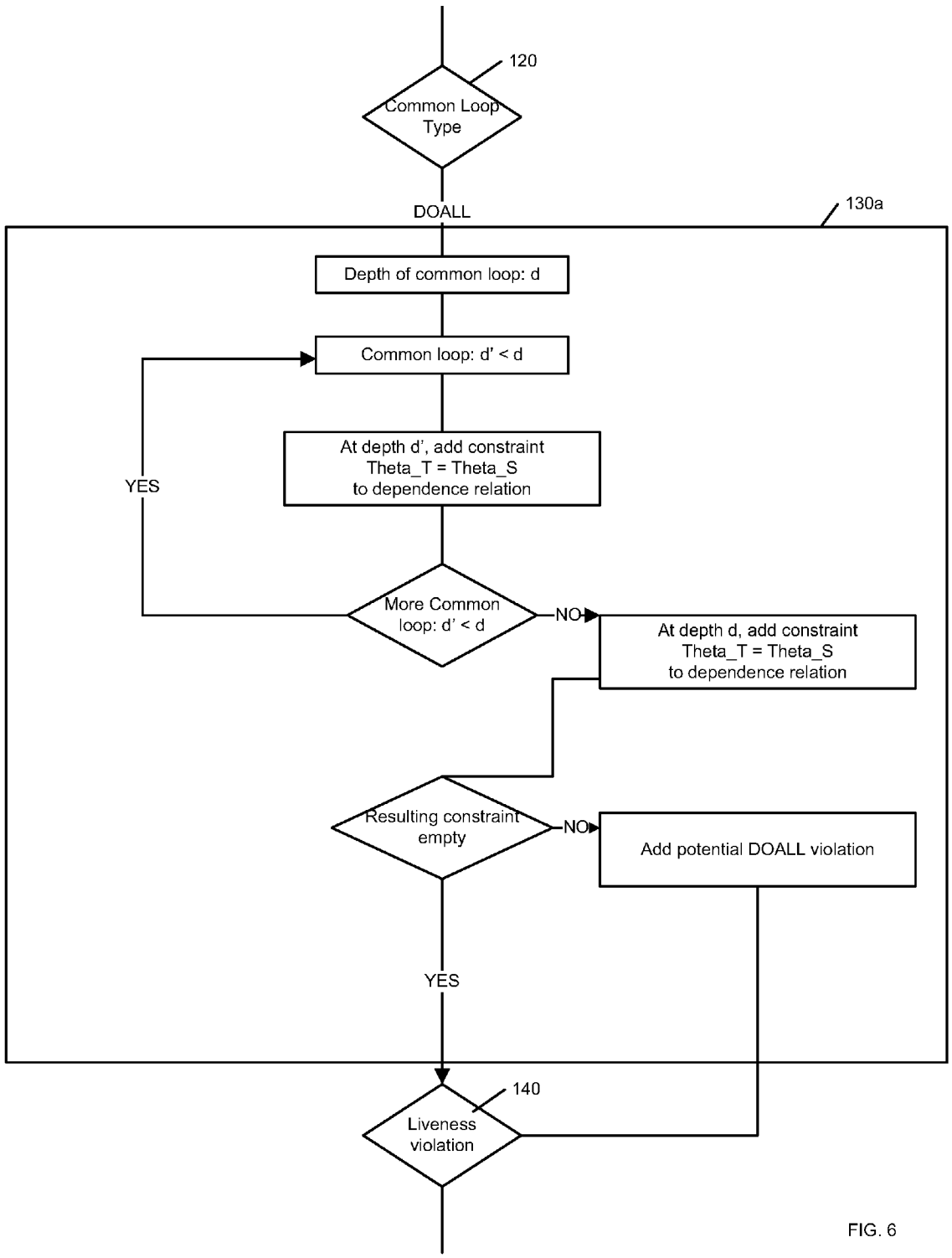
FIG. 6 illustrates an embodiment of a provided method of optimizing a computer program in which potential violations of doall type loops are identified.

With reference to FIG. 6, during the step 130a described with reference to FIG. 5, the depth of the common loop d (i.e., the number of nested loops) is determined. For the loop at each depth d' less than d, as well as the depth d, a constraint $\Theta^T=\Theta^S$ is added to a memory-based dependency relation corresponding to the loop. If it is determined that this set of constraints is not empty at any depth d' or d, a potential doall violation is identified. The identified doall violations are evaluated in step 140 (of FIG. 5) to determine if any of these violations causes a semantic violation.

In the case of permutable loops, bands of k consecutive permutable loops [l, l+k] are tested for violations using the one-dimensional ordering over real numbers. In this case, the violation is computed by: $V=\{\exists d \in [l,l+k], (i^T S, i^T T) \in R | [\Theta^T T] \downarrow d.i^T T < \Theta^S_d.i^S\}$. Note that if the number of loops in the permutable band is 1, the permutable violation is substantially the same as a sequential violation.

Figure 7:
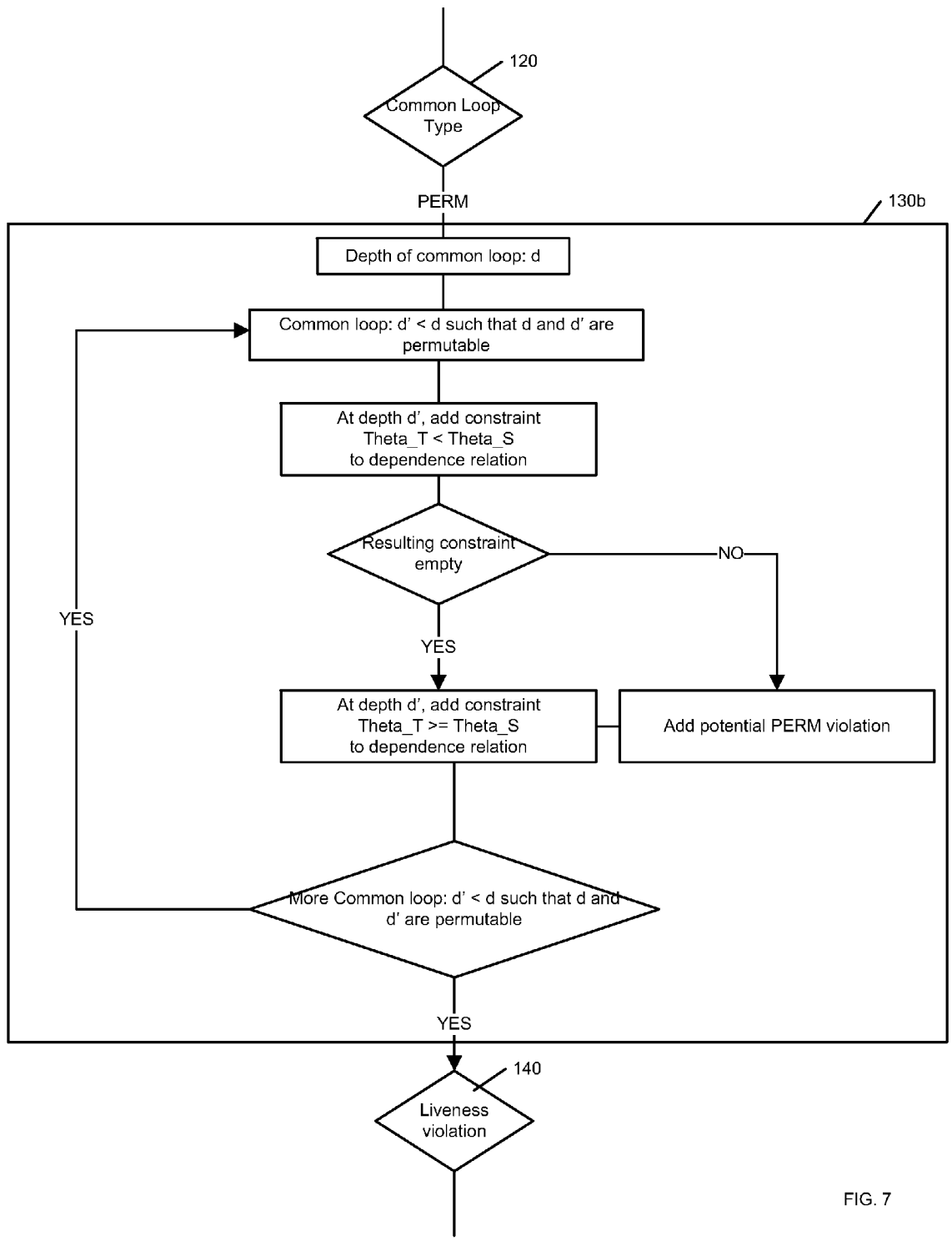
FIG. 7 illustrates an embodiment of a provided method of optimizing a computer program in which potential violations of permutable type loops are identified.

With reference to FIG. 7, during the step 130b described with reference to FIG. 5, the depth of the common loop d (i.e., the number of nested loops) is determined. For the loop at each depth d' less than d, such that the loops are permutable, a constraint $\Theta^T<\Theta^S$ is added to a memory-based dependency relation corresponding to the loop at depth d'. If it is determined that this set of constraints is not empty, a potential permutable violation is identified. Otherwise, the constraint $\Theta^T>=\Theta^S$ is added to the memory-based dependency relation. The identified permutable violations are evaluated in step 140 (of FIG. 5) to determine if any of these violations causes a semantic violation.

Figure 8:
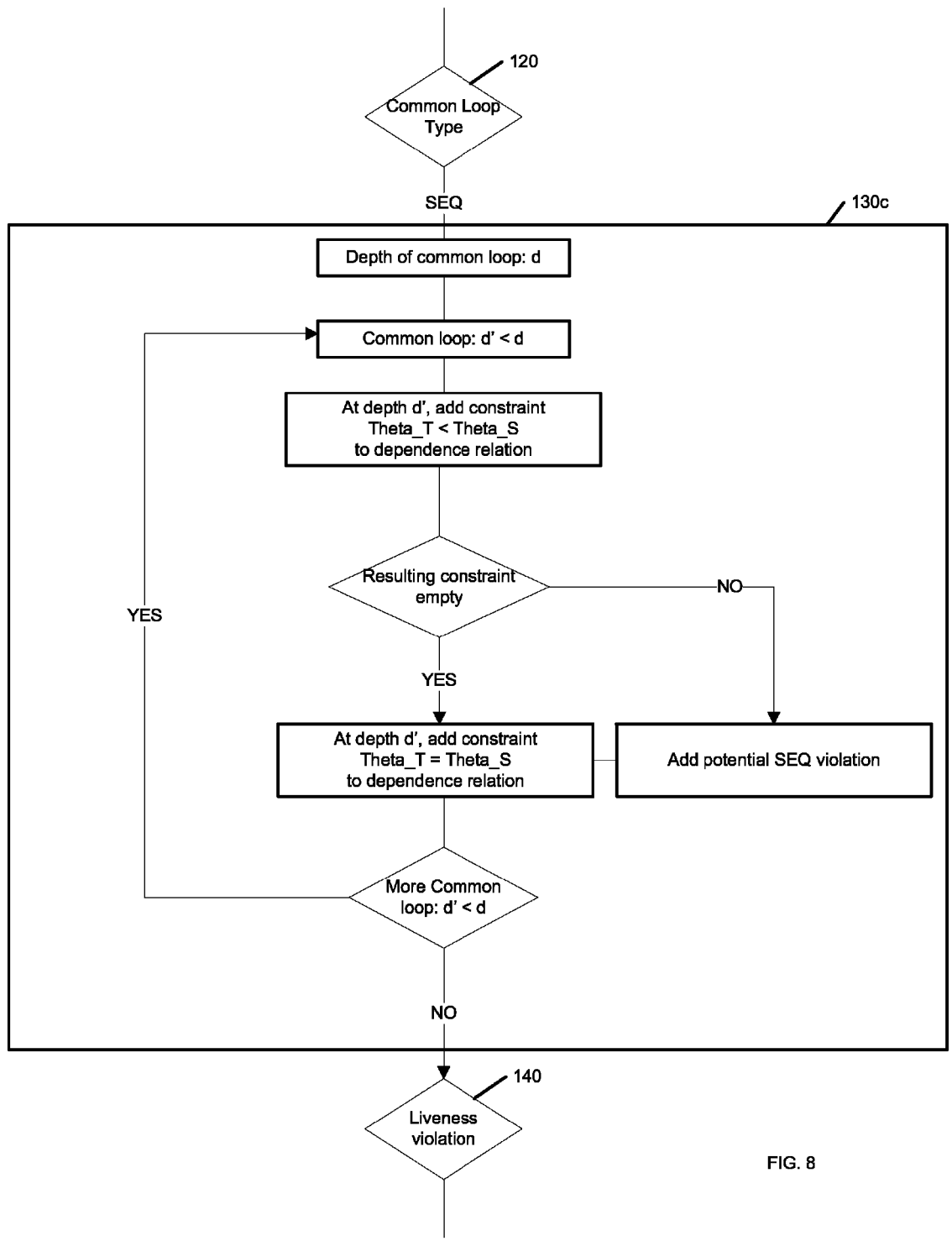
FIG. 8 illustrates an embodiment of a provided method of optimizing a computer program in which potential violations of sequential type loops are identified.

The detection of potential sequential violations, illustrated with reference to FIG. 8 in the step 130c, is similar to the detection of permutable violations. In this case, however, the loop at depth d' and the loop at depth d need not be permutable. Furthermore, if the set of constraints is empty, the constraint $\Theta^T=\Theta^S$ is added to the memory-based dependency relation. As before, the identified sequential violations are evaluated in step 140 (of FIG. 5) to determine if any of these violations causes a semantic violation.

Figure 9:
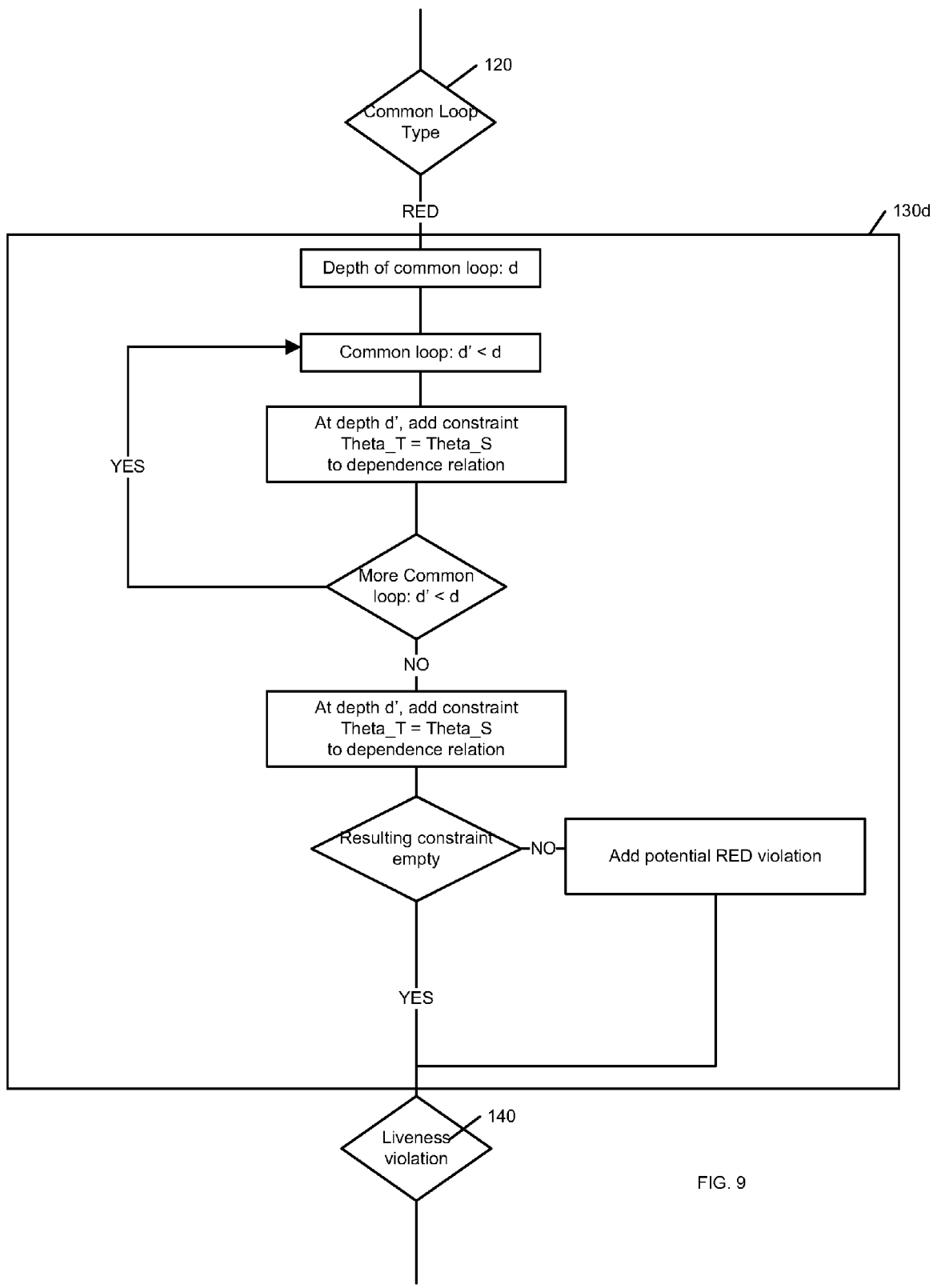
FIG. 9 illustrates an embodiment of a provided method of optimizing a computer program in which potential violations of reduction type loops are identified.

With reference to FIG. 9, during the step 130d described with reference to FIG. 5, the depth of the common loop d is determined. For the loop at each depth d' less than d, as well as for the loop at depth d, a constraint $\Theta^T=\Theta^S$ is added to a memory-based dependency relation corresponding to the loop. If it is determined that this set of constraints is not empty, a potential reduction violation is identified. The identified reduction violations are evaluated in step 140 (of FIG. 5) to determine if any of these violations causes a semantic violation.

In some embodiments the loop type information is complemented with the placement information during the construction of violated dependences. For this, the scheduler initially finds loop types that maximize parallelism of the program. However, the placement information may indicate that the computing apparatus for executing the program does not have adequate resources (e.g., processing units) such that the program as parallelized can be executed. The degree of parallelism that the computing apparatus can support is determined from the placement information. That degree of parallelism is used to degrade a loop, e.g., a doall loop may be converted into a sequential loop. The degraded loop may result in less parallelism, and may also cause fewer dependencies to be violated than those violated when the program is maximally parallelized. In effect, certain dependencies, that are not violated due to degrading of a loop, are filtered or removed from the set of violated dependencies, thereby eliminating or filtering the corresponding semantic violations.

The concept of dependence violations is sometimes too conservative. For example, in the following program code, c is assigned the value 10 while b is assigned the value 3.
  a=10;
  c=a;
  a=2;
  a=3;
  b=a;
Multiple dependencies are present in the program. In the following transformation the flow of values is consistent with the original program:
  a=2;
  a=10;
  c=a;
  a=3;
  b=a;
The memory-based output dependency between a=2 and a=10, however, is technically violated because a is assigned the value 2 then 10. Nevertheless, the program execution is correct. This is because only the values contained in variables at the time they are read are meaningful to the program execution. We call violations to such meaningful dependencies liveness violations. In various embodiments according to the present invention the correction transformations are performed on the liveness violations only. To this end, a dataflow analysis may be performed. In the following code example, there is a dataflow dependency Read-After Write of source T and target R. There is also a memory-based dependency Write-After Read of source S and target R.
  c=a; // statement R
  b=c; // statement T
  c=d; // statement S
For a liveness violation to occur, a memory-based dependency must result in a change of the flow of values. This is determined by examining the dataflow dependences. For instance, if the transformed program is:

c=d; // statement S
c=a; // statement R
b=c; // statement T the memory-based dependency of source S and target R is violated because the order of S and R has changed. However, the value read by T is still "a" and the flow of values did not change with respect to the only dataflow dependency in the program. Therefore, memory-based dependencies need to be corrected only if a violation of the memory-based dependency causes a liveness violation.

In the following example, a liveness violation occurs:
c=a; // statement R
c=d; // statement S
b=c; // statement T The value in c is overwritten by S before T has had the opportunity to read it and thus, the behavior of the program has changed. In some instances, renaming is necessary to correct the program which results in:

| c = a; | // statement R |
|---|---|
| c_renamed = d; | // statement S |
| b = c; | // statement T |

Figure 10:
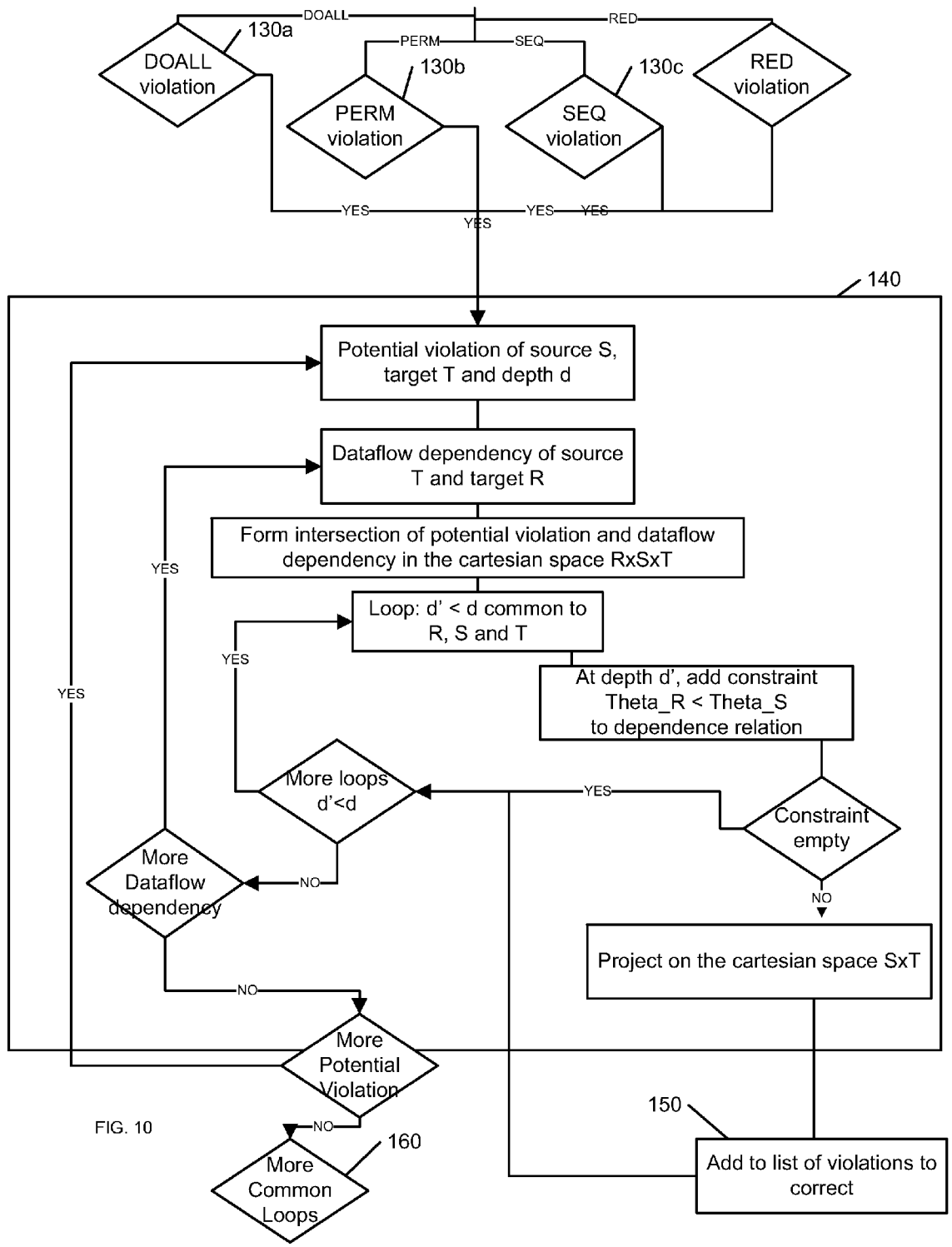
FIG. 10 illustrates an embodiment of a provided method of optimizing a computer program in which dependency violations to be corrected are identified.

With reference to FIG. 10, in order to detect a liveness violation (e.g., the step 140 of FIG. 5), a potentially violated memory-based dependency between a source S and a target T is selected. This may be achieved, for example, as discussed with reference to FIGS. 5-9. A dataflow dependency between the statement T and a statement R is also selected. From an intersection of these dependencies the dependencies that are common between both S and T and R and T are identified. Then, a loop at a depth d' common to these dependencies is identified and a constraint $\Theta^R < \Theta^S$ is added to a set of constraints.

If the constraint set is empty, the above step is repeated for other loops at different depths of the nested-loop structure. If the constraint remains satisfied after these iterations, the next dataflow dependency is selected, and evaluated by repeating the steps above, starting from the step of forming the intersection. Finally, the steps above are iterated for the next potentially violated memory-based dependency between the source S and the target T. If the constraint remains satisfied, the process continues with the step 160 of FIG. 5, as described above.

During these iterations, if the constraint set is not empty at a certain depth, the dependency is projected on the memory-based dependencies between S and T to identify dependencies that violate one or more dataflow dependencies between R and T. Such dependencies cause a semantic violation and must be corrected. Therefore, these dependencies are added to a list of dependencies to be corrected in the step 150 (of FIG. 5).

Tradeoffs Between Parallelism, Fusion and Memory Consumption

Figure 13:
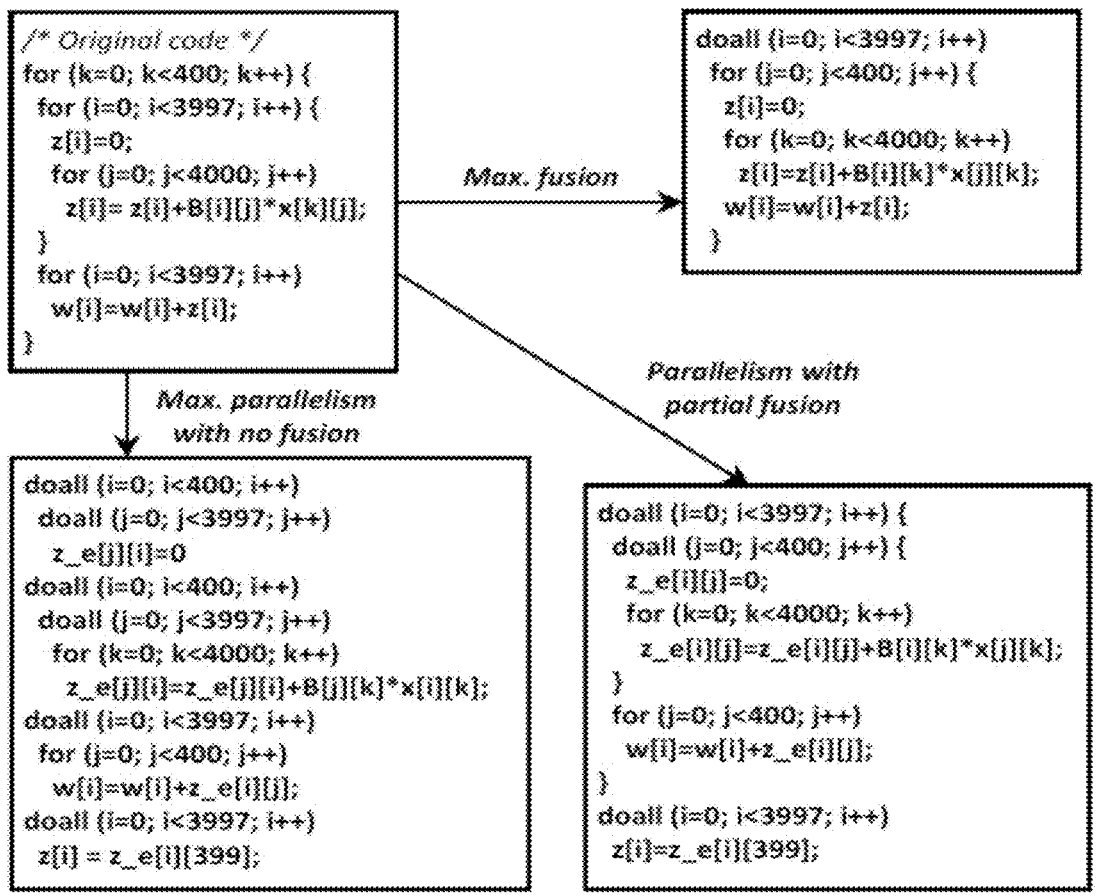
FIG. 13 illustrates a trade off between parallelization and locality.

Complex tradeoffs exist between source-code parallelization and fusion of loops and nested loop structures that can lead to maximization of locality of memory references. Memory consumption may also be impacted by this tradeoff as demonstrated FIG. 13.

The original program code may be transformed in various ways, as described above. If maximal fusion is the objective, the top right code variant can be obtained without any memory duplication. On the other hand, if absolute maximal parallelism is the objective, the temporary memory location z_e must be introduced which increases the memory consumption but also the available parallelism. Note that full expansion into z_e[i][j][k], as it would be created by full array expansion, may not be necessary. The maximized parallelization is represented by the code variant at the bottom left. Alternatively, the total memory consumption of the program can be limited to a manageable level via partial fusion. As explained below, various embodiments of the present invention facilitate simultaneous exploration of the tradeoffs between parallelism, fusion (which can increase localization), and memory consumption.

A tradeoff between memory consumption and fusion/distribution may exist even without parallelization of the code. In the original code on the left, for example, a single scalar value "a" is sufficient to store all the variables that need to be live at the same time. If the loop is distributed, however, the scalar a must be expanded to preserve correct program semantics even if the loop is executed serially. These loop behaviors are modeled and a an optimized program that balances the parallelism and memory bandwidth is generated.

| // Original | for (i=0; i<N; i++) |
|---|---|
| for (i=0; i<N; i++) | a = B[i]; |
| a = B[i]; | for (j=0; j<N; j++) |
| A[i] = a; | A[i] = a; |

Dataflow Dependencies and Dataflow Propagation

A dataflow dependency is a special kind of Read-After-Write dependency. It conveys additional last-write information. Dataflow dependencies are obtained by performing Array Dataflow Analysis. When this analysis is exact, the resulting dependencies do not carry any redundancy (i.e. each read memory value has at most one producer). Such an analysis typically proceeds by terminating old definitions to memory locations by newer definitions in the original program order. Consider the exemplary code below:
for (i=0; i<10; i++) A[i]=0; // Statement S1
for (i=0; i<N; i++) A[i]=i; // Statement S2
for (i=0; i<10; i++) B[i]=A[i]; // Statement S3
Without dataflow analysis, the producer-consumer dependencies are R={[[i], [i']]|i=i', [i] in D1, [V] in D3, <S1, [i]><<<S3, [i']>} union {[[i], [i']]|i=i', [i] in D2, [i'] in D3, <S2, [i]><<<S3, [i']>}. On the other hand, if array dataflow analysis is performed, the dependence between S1 and S3 is partially terminated by the write operation in S2 depending on the value of the parameter N. Then the producer-consumer dependencies become:
If (N<10) then R={[[i], [i']]|i=i', i<=N<=10, [i] in D1, [i'] in D3, <S1, [i]><<<S3, [i']>} union {[[i], [i']]|i=[i] in D2, [i'] in D3, <S2, [i]><<<S3, [i']>}
Else R={[[i], [i']]|i=i', [i] in D2, [i'] in D3, <S2, [i]><<<S3, [i']>}

The need for dataflow propagation may occur when a written variable is renamed or expanded. In that event, the program may need to be updated so that statements referencing the memory locations that were modified properly reference the new locations. The information about the renamed or expanded variables (i.e., memory locations) can be derived by computing the last write to a memory location and can be represented by a quasi-affine selection tree (or quast) that includes a tree of conditionals with dependence functions at the leaves. In some instances, the propagation of dataflow information creates a need for index-set splitting in the target iteration domain of the dependencies. The conditionals are based on the last-write quast. The following example illustrates the effects of dataflow propagation. The original program writes the value 0 into B[0].

c=0; // Statement S1
    for (i=0; i<=n; i++) {
    B[i]=c; // Statement S2
    c=c+A[i]; // Statement S3
    }

Suppose the memory location written by statement S3 is renamed from "c" to "c_r". Proper dataflow propagation requires that the first iteration of the loop remain unchanged. After the transformation the final code becomes:

```
c = 0;                              // Statement S1
for (i=0; i<=n; i++) {
    if (i == 0) {
        B[i] = c;                   // Statement S2
        c_r = c + A[i];             // Statement S3
    }
    if (i > 0) {
        B[i] = c_r;                 // Statement S4
        c_r = c_r + A[i];           // Statement S5
    }
}
c = c_r;                            // Statement S6
```

Converting Weak References into Strong References

To support data dependent conditionals, an embodiment of this invention may convert data dependent conditionals creating weak references into strong references by if-conversion and insertion of idempotent copies. Consider the original program code:

for (i=0; i<10; i++)
    A[i]=f(i);
    for (i=0; i<10; i++) {
    if (A[i]>10) {
        A[i]+=A[i];
    }
    }

The second write to A[i] is conditional. It is called a weak reference because not all control flow paths result in a modification of the memory state. As such, it is not suitable for dataflow dependency computation. After the if-conversion according to one embodiment of the present invention, the program becomes:

for (i=0; i<10; i++)
    A[i]=f(i);
    for (i=0; i<10; i++) {
    Boolean p=(A[i]>10);
    if (p) A[i]+=A[i];
    }

The conditional write is then transformed into a non-conditional write that will modify the memory state along any control flow path. This includes adding an idempotent copy along the complementary path, resulting in:

for (i=0; i<10; i++)
    A[i]=f(i);
    for (i=0; i<10; i++) {
    Boolean p=(A[i]>10);
    A[i]+=if (p) A[i] else 0;
    }

In this form, the transform code exhibits strong references and can be corrected using the dataflow propagation algorithm and optimized, corrected, or both using other loop transforms.

Copy-Out Operations

In general it is necessary to insert operations that will copy back the last value from a temporary duplicated location in order to preserve the proper values in the memory locations on exiting the optimized region. Consider the following original code:

// Original code for (I=0; I<=N; i++) {
    for (j=0; j<=N; j++) {
        C[i]=i+j+1;
        B[i] [1+j]=B[1+i] [j]*C[i];
    }}

Here, the arrays B and C are assumed accessed outside of the scope of optimization. Hence, one embodiment according to the present invention ensures that the arrays ultimately contain the proper values. To this end, copy operations that are subsequently modified by the dataflow propagation are added to the original code. The code on the left below illustrates the operations that are added and originally do not perform any change to the memory state. The code on the right below illustrates the final optimized output code, after dataflow propagation takes place.

```
for (i = 0; i <= N; i++)   {           doall (i = 0; i <= N; i++) {
    for (j = 0; j <= N; j++) {             doall (j = 0; j <= N; j++) {
        C[i] = i+j+1;                          C_e[i] [j] = i+j+1;
        B[i] [1+j]=B[1+i] [j] *C[i];           B_r[i] [1+j] =
}}                                                 B[1+i] [j]*C_e[i] [j];
doall (i=0; i<=1023; i++) {            }}
    doall (j = max (1-i, 0);           doall (i = 0; i <= N; i++) {
        j <= min (1023, 2045-i);           doall (j=1; j<=1023; j++){
        j++) {                                 B[i, j] = B_r[i] [-1 + j];
        B[i] [j] = B[i] [j];           }}
}}                                     doall (i = 0; i <= N; i++) {
doall (i = 0; i <= N; i++) {               C[i] = C_e[N] [i]);
    C[i] =C[i];                        }
}
```

Placement-Aware, Iterative, Corrective Array Expansion Algorithm
Input: A GDG with only nodes, a memory limit M
Output: A schedule GDG fitting within M
1. $F_{dep} \leftarrow \emptyset$
2. GDG.nodes←insert_copy_out_operations( )
3. GDG.edges←array_dataflow_analysis( )
4. GDG.schedule←schedule({GDG.deps∪$F_{dep}$})
5. GDG.placement←place_pe_grid(GDG.schedule)
6. GDG.loop_info←compute_loop(GDG.schedule, GDG.placement)
7. foreach A∈GDG.nodes.written_references {
8. V_writes←∅
9.     GDG.edges←{GDG.edges∪violations(GDG.edges, GDG.schedule, GDG.loop_info)}
10. foreach w=(T→S)$_v$∈GDG.edges.violations {
11. if ! T.writes(A) continue
12. foreach r=(T'→S')$_d$∈GDG.edges.dataflow {
13. if ! T'.reads(A) continue
14. if ! violates liveness(w,r) continue
15. V_writes←V_writes∪liveness_pb(w, r)
16. }}
17. if V_writes is ∅ continue
18. GDG.index_set_splitting(V_writes)
19. GDG.expand(V_writes)
20. if GDG.memory_consuption( )>M {
21. $F_{dep} \leftarrow F_{dep}$∪GDG.get_expensive_violation( )
22. GDG.reset( )
23. goto step 4
24. }
25. GDG.dataflow_propagation( )
25. GDG.update_graph( )
26. }
27. GDG.remove_dead_code( )

With reference to the code segment shown above, In one embodiment according to the present invention, a list Fdep of memory-based dependences that must always be preserved is initialized in step 1. The list Fdep may be empty in some instances. In one embodiment, a memory limit M is set to infinity, and the list Fdep is never incremented. This can cause the scheduler not to respect any memory-based dependences, resulting in maximized parallelism without regard to memory consumption. If the uncovered parallelism results in liveness violations, the scheduled program may be corrected by employing total static expansion, array expansion, renaming, and/or index-set splitting.

In another embodiment, Fdep is initialized with an additional selected subset of the memory-based dependencies and the scheduler behaves conservatively with respect to those dependencies, i.e., preserves such dependencies. This situation can occur when dataflow analysis cannot be computed exactly because one or more weak references were not converted into strong references. Then, the dependencies represented by the weak references are included in the initial Fdep.

As stated above, in step 2, idempotent copies are inserted to the liveout memory locations, i.e., memory location that may be read outside the code segment or portion being optimized. These statement copies are optimized during dataflow propagation in step 25, as explained below. Portions of copies to liveout memory locations that are not modified are deleted in the post-processing phase in step 27. Array Dataflow Analysis is performed in step 3 to detect the dataflow dependencies (e.g., certain read-after-write dependencies) from the program code, as described above. These dependencies are added to a generalized directed graph (GDG), and would be observed by the scheduler.

In step 4, scheduling that respects the dataflow dependencies computed in step 3 and the dependencies in Fdep is performed. Scheduling is used to derive placement information and loop types. Many different scheduling algorithms exist in the field and one of ordinary knowledge can appreciate that any scheduling technique that proceeds on loops can be employed in an embodiment of our invention. Placement information may be derived in step 5. Placement information may be used to tailor the schedule to the peculiarities of the second computing apparatus (e.g., the number of processors or processor cores in the apparatus, the number of threads supported by a processor, etc.) thereby allowing a finer tradeoff between scheduling and array expansion.

The loop-type information provided by the scheduler is modified in step 6 according to the placement information. For example, as previously described, a doall loop may be degraded into a sequential loop, thereby decreasing the degree of parallelism in the program. Steps 7, 8 and 9 are iterated for the arrays written in memory and in these steps the dependency violations with respect to each of the arrays are determined. The loop-type information may be considered in determining whether a dependency violation has occurred so as to reduce the number of dependencies that must be observed by the scheduler. In general, the fewer the dependencies to be observed, the greater the available parallelism in the program.

In steps 10 through 16 the memory-based dependency violations are refined into liveness violation sets. For each of the false dependency violations (e.g., write-after-write, write-after-read, etc.) on a reference A, the dataflow dependencies reading the reference A are iterated, and if the intersection of the dataflow dependence and the memory-based dependency violation is non-empty, the dependency violation is a liveness violation; otherwise, the violation would not cause a semantic program violation and may be ignored. Any liveness violation, if detected, is corrected as described below.

In some embodiments, if the intersection above is not empty, in step 18 index-set splitting may be performed on the statements writing to a memory location that cause a liveness violation. Only the offending index-set portion of the array write (i.e., the portion of the array in which the liveness violation is determined to have occurred) is then expanded in step 19, thereby correcting the liveness violation. Limiting array expansion in this way may result in less memory consumption. This is achieved, in part, by projecting the dependency-violation set on the iteration domain of the offending array-write statement.

Renaming and Expansion: In some embodiments, the dependency-violation correction, i.e., expansion step 19 may either be an array expansion (which entails an array dimensionality increase) or a simpler renaming. Whether renaming or expansion is performed depends on whether renaming is sufficient to solve a liveness violation. This decision is related to dataflow propagation. In such cases, array expansion may be necessary and a criterion is provided for determining whether renaming is sufficient.

In particular, for each liveness violation T→S, we compute its intersection with all dataflow dependencies S→R: 1) if all intersections are empty, the array written by T may safely be renamed and all false dependencies disappear after dataflow propagation, 2) otherwise, the sub-portion corresponding to the non empty intersections must be expanded and a new array with higher dimensionality is created to absorb all the writes. The indexing function is recomputed and has a strictly increasing rank to benefit from the added storage dimensionality. Eventually, the invention iterates on all nodes that are still in violation at a given step. It gathers all dependencies that are the cause for the considered violation and computes the new renamed or expanded array. Dataflow propagation is then called to update all the depending nodes.

Figure 11:
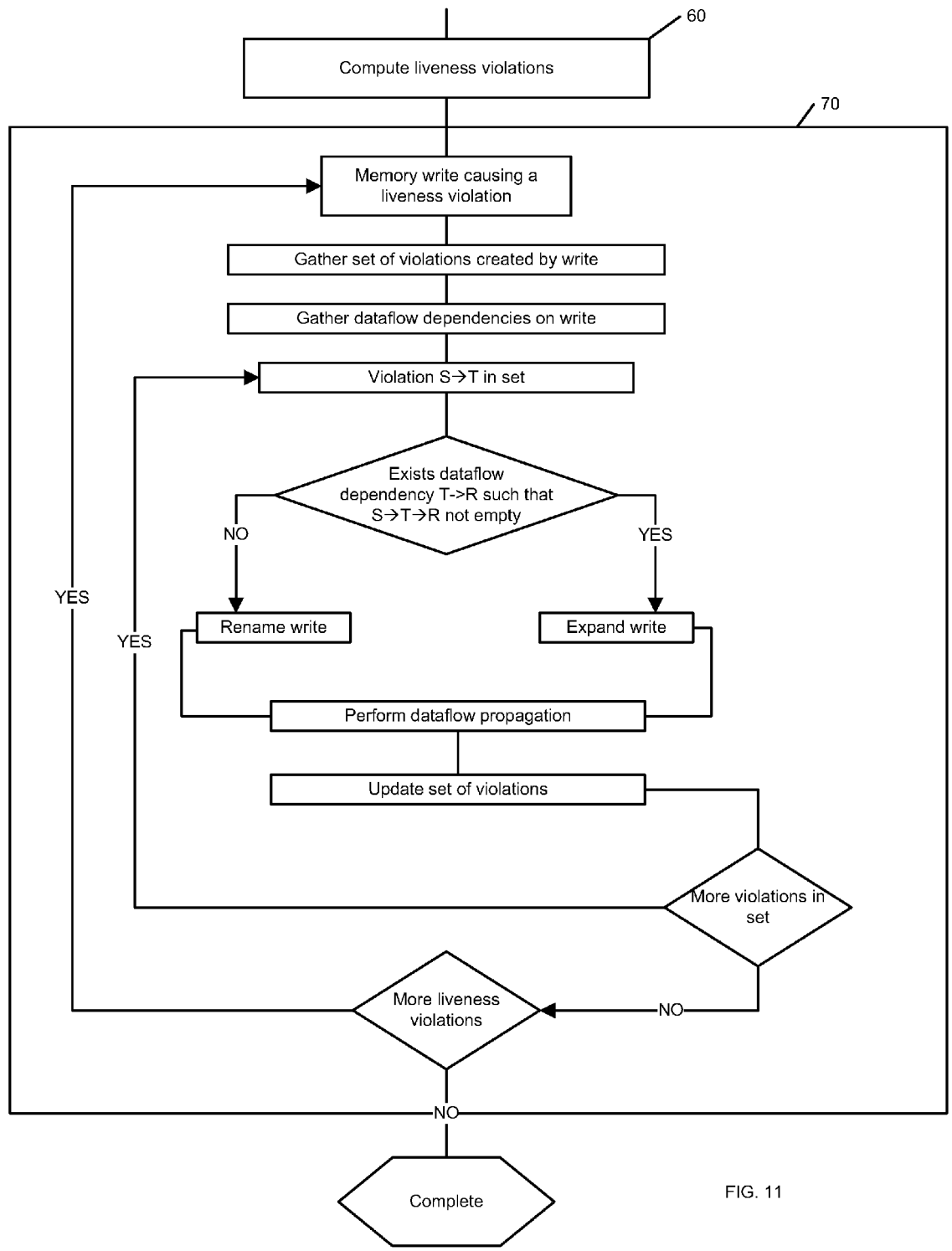
FIG. 11 illustrates an embodiment of a provided method of optimizing a computer program in which a suitable correction method is determined.

In the exemplary process illustrated with reference to FIG. 11, in the step 70 of FIG. 5, a memory-write operation causing a liveness violation is selected. A set of memory-based dependency violations created by the memory-write operation is created, and the dataflow dependencies associated with the memory-write operation are also collected. Then a violated memory-based dependency in the set between the statements S and T is selected. A dataflow dependency between the statements T and R is also selected. If the violation of dependency between S and T intersects with a dataflow dependency between S and R, array expansion of the memory-write operation is performed. Otherwise, renaming of the memory-write operation is performed.

Subsequently, dataflow propagation is performed and additional violations, if any, are detected and the set of memory-based dependency violations is updated. The steps above, starting from the selection of a dependency violation from the set, are repeated until all memory-based dependency violations in the set are evaluated. The above steps are repeated for all liveness violations.

Recovering From Memory Expansion Limit: In steps 20 through 24, if the limit on memory increase M is exceeded, i.e., more than the maximum allowable memory is consumed by the current schedule, the set of dependencies Fdep is augmented with the dependence that entails the most violations. Alternatively, or in addition other dependencies may be selected. Then, the steps 4 through 19 are repeated. In the second iteration, the scheduler must observe at least one dependency that was ignored in the previous iteration. This may allow for less parallelism, but may decrease the memory consumption such that the memory limit M is met. The steps 4 through 24 are iterated until a schedule that satisfies the memory limit M is produced.

Dataflow Propagation: Dataflow propagation may be performed in step 25 if a written memory location is expanded in step 19. The program is updated so that statements referencing the modified memory locations properly reference the new locations. This information is directly obtained from the flow dependences in the GDG. Propagating this information creates a need for index-set splitting in the statements that correspond to the read portion of the dependencies. This split is needed for semantic correctness. The determination of the split is achieved by projecting the dataflow dependency on the iteration domain of the reading statement using standard operations on iteration domains.

Removing Dead Code: As described above, in step 2 idempotent copy-out operations are inserted. These copies may be modified during other steps, e.g., dataflow propagation, etc. If portions of such copies are not modified at all during the whole corrective array expansion step (i.e., step 19), the copied statements merely read and write the same data, and are deleted from the transformed program in step 27.

Figure 12:
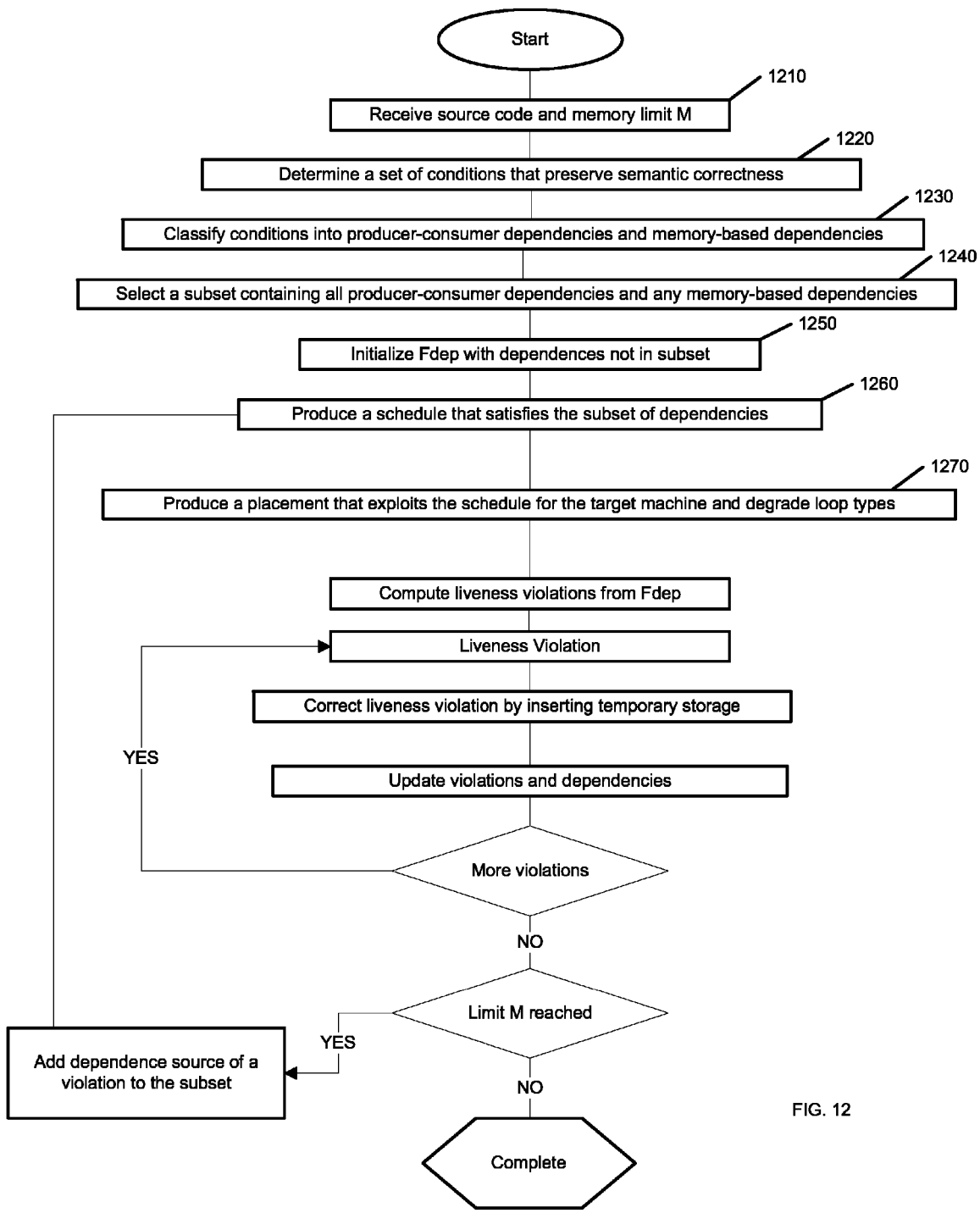
FIG. 12 illustrates another embodiment of a provided method of optimizing a computer program.

Accordingly, with reference to FIG. 12, in a provided embodiment of a process according to the present invention, a source code to be optimized and a memory limit M are received in step 1210. A set of conditions (e.g., memory-based and/or dataflow dependencies) that preserve semantic correctness of the source code are determined in step 1220. In step 1230, the conditions are classified into producer-consumer dependencies and memory-based dependencies. A subset that includes all producer-consumer dependencies and one or more memory-based dependencies is formed in step 1240. Another subset, denoted as Fdep, is initialized in step 1250 with the other memory-based dependencies identified in the steps 1220, 1230 that are not in the first subset formed in the step 1240.

A schedule that satisfies the first subset of dependencies is produced in step 1260. Then, a placement for the schedule, i.e., an assignment of various operations in the source code to various processing units of a computer at various time steps is generated in step 1270. In this, the placement takes advantage of the parallelized operations in the schedule, and available resources (e.g., execution units, processor cores, etc.) of the computer (also called a target machine) such that the utilization of the resources of the computer is maximized. If the computer does not provide adequate resources, so that the operations in the source code cannot be executed in parallel as indicated by the schedule, the loop types are degraded as described, for example, with reference to FIGS. 6-9. This can result in decreasing the parallelism in the source code, but can also decrease the memory footprint of the code.

Because the schedule is required to satisfy conditions included only in the first subset, some conditions in Fdep may be violated. Whether one or more these violations are liveness violations is then determined. For each liveness violation, the violation is corrected, for example, by providing temporary storage. The correction may include array expansion or renaming, as described above with reference to FIG. 11. The set of liveness violations and dependencies is then updated.

After all liveness violations are evaluated and corrected, if the specified memory limit M is reached, a memory-based dependency from Fdep, that was violated is added to the first subset of dependencies, and the above steps from the step 1260 are repeated. In this iteration, a memory-based dependency that was previously violated must be satisfied during scheduling in the step 1260. Accordingly, less parallelism may be achieved in the modified source code in this iteration than in the previous iteration. Advantageously, however, the modified code may require less memory and may meet the specified memory limit M.

Thus, it is seen that methods and an apparatus for optimizing source code on a custom first computing apparatus for execution on a second computing apparatus are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of scheduling operations of a program on a multi-execution unit computing apparatus, the method comprising:
    receiving, at a first computing apparatus, a computer program comprising a set of operations; and
    optimizing the computer program for execution on a second computing apparatus, the second computing apparatus comprising at least two execution units,
    wherein the optimizing step comprises (i) initializing a set of memory-based dependencies, (ii) performing dataflow analysis to identify one or more dataflow dependencies within the set of operations, and (iii) scheduling the set of operations, the scheduling being based at least in part on a performance cost of a schedule and a memory-usage cost of the schedule,
    whereby (a) any dependency in the set of memory-based dependencies and the identified one or more dataflow dependencies are not violated, and (b) a subset of operations in the set of operations is scheduled for execution by a first unit of the at least two execution units and a subset of operations in the set of operations is scheduled for execution by a second unit of the at least two execution units.

2. The method of claim 1, wherein the scheduling step comprises at least one of minimizing the performance cost and limiting the memory-usage cost to a specified value.

3. The method of claim 1, wherein the scheduling step comprises employing a scheduling function.

4. The method of claim 3, wherein the scheduling function assigns a partial execution order between iterations of an operation in the set of operations.

5. The method of claim 1, further comprising representing dependencies within the set of operations as a generalized dependence graph (GDG).

6. The method of claim 5, further comprising adding a copy-out operation to the GDG.

7. The method of claim 1, further comprising transforming all weak memory references in the set of operations into strong memory references.

8. The method of claim 1, wherein the initializing the set of memory-based dependencies comprises adding one or more memory-based dependencies associated with a weak memory reference in the set of operations to the set of memory-based dependencies.

9. The method of claim 1, further comprising determining a placement of operations in the set of operations according to a property of the second computing apparatus.

10. The method of claim 1, further comprising:
collecting dependency violations after the scheduling step; and
identifying a dependency violation that causes a semantic violation in the program.

11. The method of claim 10, further comprising determining a loop type associated with an operation in the set of operations, wherein the semantic violation is related to the loop type.

12. The method of claim 1, further comprising correcting a dependency violation after the scheduling step.

13. The method of claim 12, wherein a memory write operation in the set of operations causes the dependency violation, and the correcting step comprises renaming a memory location associated with the memory write operation as a new memory location.

14. The method of claim 13, wherein the dependency violation is a liveness violation.

15. The method of claim 13, further comprising replacing a memory read operation in the set of operations, reading from the renamed memory location, with a new memory read operation reading from the new memory location.

16. The method of claim 12, wherein the correcting step comprises expanding a write operation in the set of operations to provide a new memory location, thereby removing the semantic violation.

17. The method of claim 11, further comprising performing index-set splitting transformation of a write operation in the set of operations, wherein the write operation causes the semantic violation.

18. The method of claim 1, wherein the optimizing step further comprises:
comparing the memory-usage cost with a specified memory limit; and
if the memory limit is exceeded, (i) selecting a memory-based dependency, (ii) updating the set of memory-based dependencies with the selected memory-based dependency, and (iii) repeating the scheduling step.

19. The method of claim 18, wherein the selecting step comprises identifying a memory-based dependency causing more semantic violations than any other memory-based dependency.

20. The method of claim 18, wherein the selecting step comprises selecting all memory-based dependencies causing a semantic violation.

21. The method of claim 1, wherein the program after the scheduling step retains a dependency violation that is not a semantic violation.

22. The method of claim 1, wherein the optimizing step further comprises:
determining a set of conditions that preserve the semantic correctness of the program;
representing the set of conditions preserving semantic correctness in the form of a generalized dependence graph;
classifying the conditions into producer-consumer dependencies and memory-based dependencies;
deriving at least one multidimensional piecewise affine function to schedule operations in the optimized program.

23. The method of claim 1, further comprising employing operation placement for the operations in the set of operations to filter semantic violations.

24. A computing apparatus comprising:
a processor; and
a memory coupled to the processor, the memory comprising a set of processor executable instructions that, when executed by the processor, configure the computing apparatus to modify a computer program comprising a set of operations for execution on a second computing apparatus, the second computing apparatus comprising at least two execution units, the configuration comprising a configuration to:
(i) initialize a set of memory-based dependencies;
(ii) perform dataflow analysis to identify one or more dataflow dependencies within the set of operations; and
(iii) schedule the set of operations, the schedule being based at least in part on a performance cost of the schedule and a memory-usage cost of the schedule,
whereby (a) any dependency in the set of memory-based dependencies and the identified one or more dataflow dependencies are not violated, and (b) a subset of operations in the set of operations is scheduled for execution by a first unit of the at least two execution units and a subset of operations in the set of operations is scheduled for execution by a second unit of the at least two execution units.

25. The computing apparatus of claim 24, wherein the schedule corresponds to at least one of a minimized performance cost and the memory-usage cost limited to a specified value.

26. The computing apparatus of claim 24, wherein the schedule is obtained by a scheduling function.

27. The computing apparatus of claim 26, wherein the scheduling function assigns a partial execution order between iterations of an operation in the set of operations.

28. The computing apparatus of claim 24, wherein the configuration further comprises a configuration to represent dependencies within the set of operations as a generalized dependence graph (GDG).

29. The computing apparatus of claim 28, wherein the configuration further comprises a configuration to add a copy-out operation to the GDG.

30. The computing apparatus of claim 24, wherein the configuration further comprises a configuration to transform all weak memory references in the set of operations into strong memory references.

31. The computing apparatus of claim 24, wherein the initialization of the set of memory-based dependencies comprises an addition of one or more memory-based dependencies associated with a weak memory reference in the set of operations to the set of memory-based dependencies.

32. The computing apparatus of claim 24, wherein the configuration further comprises a configuration to determine a placement of operations in the set of operations according to a property of the second computing apparatus.

33. The computing apparatus of claim 24, wherein the configuration further comprises a configuration to:
collect dependency violations after the scheduling; and
identify a dependency violation that causes a semantic violation in the program.

34. The computing apparatus of claim 33, wherein the configuration further comprises a configuration to determine a loop type associated with an operation in the set of operations, wherein the semantic violation is related to the loop type.

35. The computing apparatus of claim 24, wherein the configuration further comprises a configuration to correct a dependency violation after the scheduling.

36. The computing apparatus of claim 35, wherein a memory write operation in the set of operations causes the dependency violation, and the correction of the dependency violation comprises a renamed memory location associated with the memory write operation as a new memory location.

37. The computing apparatus of claim 36, wherein the dependency violation is a liveness violation.

38. The computing apparatus of claim 36, wherein the configuration further comprises a configuration to replace a memory read operation in the set of operations, that reads from the renamed memory location, with a new memory read operation that reads from the new memory location.

39. The computing apparatus of claim 35, wherein the correction of the dependency violation comprises an expansion of a write operation in the set of operations to provide a new memory location, thereby removing the semantic violation.

40. The computing apparatus of claim 34, wherein the configuration further comprises a configuration to perform index-set splitting transformation of a write operation in the set of operations, wherein the write operation causes the semantic violation.

41. The computing apparatus of claim 24, wherein the configuration further comprises a configuration to:
compare the memory-usage cost with a specified memory limit; and
if the memory limit is exceeded, to: (i) select a memory-based dependency, (ii) update the set of memory-based dependencies with the selected memory-based dependency, and (iii) repeat the schedule.

42. The computing apparatus of claim 41, wherein the selection of the memory-based dependency comprises an identification of a memory-based dependency causing more semantic violations than any other memory-based dependency.

43. The computing apparatus of claim 41, wherein the selection the memory-based dependency comprises a selection all memory-based dependencies causing a semantic violation.

44. The computing apparatus of claim 24, wherein the program after the schedule retains a dependency violation that is not a semantic violation.

45. The computing apparatus of claim 24, wherein the configuration further comprises a configuration to:
determine a set of conditions that preserve the semantic correctness of the program;
represent the set of conditions preserving semantic correctness in the form of a generalized dependence graph;
classify the conditions into producer-consumer dependencies and memory-based dependencies;
derive at least one multidimensional piecewise affine function to schedule operations in the optimized program.

46. The computing apparatus of claim 24, the configuration further comprises a configuration to employ operation placement for the operations in the set of operations to filter semantic violations.

47. An article of manufacture, comprising a non-transitory machine-readable medium storing instructions that, when executed by a machine, configure the machine to:
receive, at a first computing apparatus, a computer program comprising a set of operations; and
optimize the computer program for execution on a second computing apparatus, the second computing apparatus comprising at least two execution units,
wherein the optimization comprises a configuration to (i) initialize a set of memory-based dependencies, (ii) perform dataflow analysis to identify one or more dataflow dependencies within the set of operations, and (iii) schedule the set of operations, the schedule being based at least in part on a performance cost of the schedule and a memory-usage cost of the schedule,
whereby (a) any dependency in the set of memory-based dependencies and the identified one or more dataflow dependencies are not violated, and (b) a subset of operations in the set of operations is scheduled for execution by a first unit of the at least two execution units and a subset of operations in the set of operations is scheduled for execution by a second unit of the at least two execution units.

48. The article of claim 47, wherein the schedule corresponds to at least one of a minimized performance cost and the memory-usage cost limited to a specified value.

49. The article of claim 47, wherein the schedule is obtained by a scheduling function.

50. The article of claim 49, wherein the scheduling function assigns a partial execution order between iterations of an operation in the set of operations.

51. The article of claim 47, wherein the instructions further configure the machine to represent dependencies within the set of operations as a generalized dependence graph (GDG).

52. The article of claim 51, wherein the instructions further configure the machine to add a copy-out operation to the GDG.

53. The article of claim 47, wherein the instructions further configure the machine to transform all weak memory references in the set of operations into strong memory references.

54. The article of claim 47, wherein the initialization of the set of memory-based dependencies comprises an addition of one or more memory-based dependencies associated with a weak memory reference in the set of operations to the set of memory-based dependencies.

55. The article of claim 47, wherein the instructions further configure the machine to determine a placement of operations in the set of operations according to a property of the second computing apparatus.

56. The article of claim 47, wherein the instructions further configure the machine to:
collect dependency violations after the scheduling; and
identify a dependency violation that causes a semantic violation in the program.

57. The article of claim 56, wherein the instructions further configure the machine to determine a loop type associated with an operation in the set of operations, wherein the semantic violation is related to the loop type.

58. The article of claim 47, wherein the instructions further configure the machine to correct a dependency violation after the scheduling.

59. The article of claim 58, wherein a memory write operation in the set of operations causes the dependency violation, and the correction comprises a renamed memory location associated with the memory write operation as a new memory location.

60. The article of claim 59, wherein the dependency violation is a liveness violation.

61. The article of claim 59, wherein the instructions further configure the machine to replace a memory read operation in the set of operations, that reads from the renamed memory location, with a new memory read operation that reads from the new memory location.

62. The article of claim 58, wherein the correction comprises an expansion of a write operation in the set of operations to provide a new memory location, thereby removing the semantic violation.

63. The article of claim 57, wherein the instructions further configure the machine to perform index-set splitting transformation of a write operation in the set of operations, wherein the write operation causes the semantic violation.

64. The article of claim 47, wherein the optimization further comprises a configuration to:
   compare the memory-usage cost with a specified memory limit; and
   if the memory limit is exceeded, to: (i) select a memory-based dependency, (ii) update the set of memory-based dependencies with the selected memory-based dependency, and (iii) repeat the schedule.

65. The article of claim 64, wherein the selection comprises an identification of a memory-based dependency causing more semantic violations than any other memory-based dependency.

66. The article of claim 64, wherein the selection comprises a selection all memory-based dependencies causing a semantic violation.

67. The article of claim 47, wherein the program after the schedule retains a dependency violation that is not a semantic violation.

68. The article of claim 47, wherein the optimization further comprises:
   a determination of a set of conditions that preserve the semantic correctness of the program;
   a representation of the set of conditions preserving semantic correctness in the form of a generalized dependence graph;
   a classification of the conditions into producer-consumer dependencies and memory-based dependencies;
   a derivation of at least one multidimensional piecewise affine function to schedule operations in the optimized program.

69. The article of claim 47, wherein the instructions further configure the machine to employ operation placement for the operations in the set of operations to filter semantic violations.

* * * * *

UNITED STATES PATENT AND TRADEMARK OFFICE
CERTIFICATE OF CORRECTION

| | |
|---|---|
| PATENT NO. | : 8,572,595 B1 |
| APPLICATION NO. | : 13/204517 |
| DATED | : October 29, 2013 |
| INVENTOR(S) | : Richard A. Lethin et al. |

It is certified that error appears in the above-identified patent and that said Letters Patent is hereby corrected as shown below:

In the Specification

At Column 1, Line 23, under the heading "GOVERNMENT INTEREST" Should Read:
-- This invention was made with government support under Contract No. FA8650-07-M-8129 and Contract No. FA8650-09-C-1645 awarded by the Air Force Research Laboratory, Contract No. F30602-03-C-0033 awarded by the Air Force Research Laboratory and DARPA, Contract No. W9113M-08-C-0146 and Contract No. W9113M-07-C-0072 awarded by the U.S. Army Space & Missile Defense Command, and Contract No. W31P4Q-07-C-0147 awarded by the U.S. Army Aviation & Missile Demand/DARPA. The government has certain rights in the invention. --

Signed and Sealed this
Thirtieth Day of August, 2022

Katherine Kelly Vidal
*Director of the United States Patent and Trademark Office*